(12) United States Patent
Lofton et al.

(10) Patent No.: US 9,284,456 B2
(45) Date of Patent: Mar. 15, 2016

(54) SUPERFICIALLY POROUS METAL OXIDE PARTICLES, METHODS FOR MAKING THEM, AND SEPARATION DEVICES USING THEM

(75) Inventors: Charles Lofton, Wilmington, DE (US); Ta-Chen Wei, Newark, DE (US); William E Barber, Landenberg, PA (US); Wu Chen, Newark, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 447 days.

(21) Appl. No.: 13/614,903

(22) Filed: Sep. 13, 2012

(65) Prior Publication Data

US 2013/0004772 A1 Jan. 3, 2013

Related U.S. Application Data

(63) Continuation-in-part of application No. 12/201,796, filed on Aug. 29, 2008, now Pat. No. 8,685,283.

(51) Int. Cl.
| | |
|---|---|
| *B32B 18/00* | (2006.01) |
| *B32B 5/22* | (2006.01) |
| *B32B 5/02* | (2006.01) |
| *C09C 1/30* | (2006.01) |
| *B01J 20/08* | (2006.01) |
| *B01J 20/10* | (2006.01) |
| *B01J 20/28* | (2006.01) |
| *B01J 20/286* | (2006.01) |
| *B01J 20/32* | (2006.01) |
| *C01B 33/18* | (2006.01) |
| *C01F 7/02* | (2006.01) |
| *C09C 1/36* | (2006.01) |
| *C09C 1/40* | (2006.01) |
| *B01J 20/283* | (2006.01) |
| *B01J 20/284* | (2006.01) |

(52) U.S. Cl.
CPC ............. *C09C 1/3063* (2013.01); *B01J 20/08* (2013.01); *B01J 20/103* (2013.01); *B01J 20/283* (2013.01); *B01J 20/28004* (2013.01); *B01J 20/284* (2013.01); *B01J 20/286* (2013.01); *B01J 20/28057* (2013.01); *B01J 20/28078* (2013.01); *B01J 20/3204* (2013.01); *B01J 20/3246* (2013.01); *B01J 20/3257* (2013.01); *B01J 20/3293* (2013.01); *B01J 20/3295* (2013.01); *C01B 33/18* (2013.01); *C01F 7/021* (2013.01); *C09C 1/3669* (2013.01); *C09C 1/407* (2013.01); *B01J 2220/64* (2013.01); *C01P 2002/02* (2013.01); *C01P 2002/72* (2013.01); *C01P 2004/03* (2013.01); *C01P 2004/04* (2013.01); *C01P 2004/51* (2013.01); *C01P 2004/61* (2013.01); *C01P 2004/62* (2013.01); *C01P 2006/12* (2013.01); *C01P 2006/16* (2013.01); *C01P 2006/17* (2013.01); *Y10T 428/2989* (2015.01)

(58) Field of Classification Search
CPC .............. B32B 18/00; B32B 5/22; B32B 5/02
See application file for complete search history.

(56) References Cited

U.S. PATENT DOCUMENTS

| | | | |
|---|---|---|---|
| 3,485,658 A | 12/1969 | Iler | |
| 3,505,785 A | 4/1970 | Kirkland | |
| 3,634,558 A | 1/1972 | Stober | |
| 3,634,588 A | 1/1972 | Steitz et al. | |
| 4,017,528 A | 4/1977 | Unger et al. | |
| 4,477,492 A | 10/1984 | Bergna et al. | |
| 4,775,520 A | 10/1988 | Unger et al. | |
| 4,983,369 A | 1/1991 | Barder et al. | |
| 5,057,296 A | 10/1991 | Beck | |
| 5,098,684 A | 3/1992 | Kresge et al. | |
| 5,897,849 A | 4/1999 | Alcaraz et al. | |
| 6,528,167 B2 | 3/2003 | O'Gara | |
| 6,686,035 B2 | 2/2004 | Jiang et al. | |
| 7,223,473 B2 | 5/2007 | Jiang et al. | |
| 7,563,367 B2 | 7/2009 | Rustamov et al. | |
| 2007/0187313 A1 | 8/2007 | Ekeroth | |
| 2007/0189944 A1* | 8/2007 | Kirkland et al. | ........... 423/118.1 |
| 2008/0269368 A1 | 10/2008 | Wyndham et al. | |

(Continued)

FOREIGN PATENT DOCUMENTS

| | | |
|---|---|---|
| EP | 2008971 A1 | 12/2008 |
| WO | 2006/001988 A1 | 1/2006 |
| WO | 2006/039507 A2 | 4/2006 |

OTHER PUBLICATIONS

Corma, Avelino, et al., "Synthesis of MCM-41 with Different Pore Diameters without Addition of Auxiliary Organics"; Chem. Mater 1997, 9, pp. 2123-2126.

(Continued)

*Primary Examiner* — Randy Gulakowski
*Assistant Examiner* — Jeffrey Washville

(57) ABSTRACT

Superficially porous hybrid particles include hybrid solid cores that each contain an inorganic material and an organic material; and porous hybrid outer shells each include the inorganic and organic materials and having ordered pores, wherein the ordered pores have a median pore size ranges from about 15 to about 1000 Å with a pore size distribution (one standard deviation) of no more than 50% of the median pore size and produce at least one X-ray diffraction peak between 0.01° and 10° of a 2θ scan range; wherein the particles have a median size range from about 0.5 μm to about 100 μm with a particle size distribution (one standard deviation) of no more than 15% of the median particle size, wherein the inorganic material comprises a metal oxide selected from silica, alumina, titania or zirconia.

22 Claims, 14 Drawing Sheets

(56) References Cited

U.S. PATENT DOCUMENTS

| | | | |
|---|---|---|---|
| 2009/0053524 A1 | 2/2009 | Yamada et al. | |
| 2009/0311533 A1 | 12/2009 | Chen et al. | |
| 2010/0051877 A1* | 3/2010 | Wei et al. | 252/408.1 |
| 2010/0213131 A1 | 8/2010 | Linford et al. | |

OTHER PUBLICATIONS

Dong-Jun, Kim, et al., "Morphology Control of Organic-Inorganic Hybrid Mesoporous Silica by Microwave Heating"; Chemistry Letters, vol. 33, No. 4 (2004); pp. 422-423.

Gritti, Fabrice, et al., "Comparative study of the performance of columns packed with several new fine silica particles Would the external roughness of the particles affect column properties?"; Journal of Chromatography A, 1166 (2007), pp. 30-46.

Inagaki, Shinji, et al., "Novel Mesoporous Materials with a Uniform Distribution of Organic Groups and Inorganic Oxide in Their Frameworks"; J. Am. Chem. Soc., 1999, 121; pp. 9611-9614.

Kapoor, Mahendra P., et al., "Synthesis of Phenylene Bridged Mesoporous Silsesquioxanes with Spherical Morphology in Ammonia Solution"; Chemistry Letters, vol. 33, No. 2 (2004); pp. 88-89.

Kimura, Tatsuo, et al., "Synthesis of mesoporous aluminophosphates using surfactants with long alkyl chain lengths and triisopropylbenzene as a solubilizing agent"; Chem. Commun., 1998; pp. 559-560.

Kirkland, J.J., et al., "Superficially porous silica microspheres for fast high-performance liquid chromatography of macromolecules"; Journal of Chromatography A, 890 (2000); pp. 3-13.

Kresge, C. T., et al., "Ordered mesoporous molecular sieves synthesized by a liquid-crystal template mechanism"; Letters to Nature, vol. 359, Oct. 22, 1992; pp. 710-712.

Lefevre, B., et al., "Synthesis of Large-Pore Mesostructured Micelle-Templated Silicas as Discrete Spheres"; Chem. Mater., 2005, 17; pp. 601-607.

Melde, Brian J., et al., "Mesoporous Sieves with Unified Hybrid Inorganic/Organic Frameworks"; Chem. Mater. 1999, 11; pp. 3302-3308.

Rebbin, Vivian, et al., "Synthesis and characterisation of spherical periodic mesoporous organosilicas (sph-PMOs) with variable pore diameters"; Microporous and Mesoporous Materials 72 (2004); pp. 99-104.

Martin, T., et al., "Morphological Control of MCM-41 by Pseudomorphic Synthesis"; Angew. Chem. Int. Ed. 2002, 41, No. 14; p. 2590-2592.

Yoshina-Ishii, Chiaki, et al., "Periodic mesoporous organosilicas, PMOs: fusion of organic and inorganic chemistry 'inside' the channel walls of hexagonal mesoporous silica"; Chem. Commun. (The Royal Society of Chemistry), 1999; pp. 2539-2540.

Sayari, Abdelhamid, et al., "New Approaches to Pore Size Engineering of Mesoporous Silicates"; Advanced Materials Communications, 1998, 10, No. 16 (Germany) (4 pages).

U.S. Appl. No. 12/201,796, filed Aug. 29, 2008, Notice of Allowance and Notice of Allowability, Dec. 9, 2013.

* cited by examiner

SUPERFICIALLY POROUS METAL OXIDE PARTICLES, METHODS FOR MAKING THEM, AND SEPARATION DEVICES USING THEM

CROSS REFERENCE TO RELATED APPLICATIONS

This is a continuation-in-part application of U.S. patent application Ser. No. 12/201,796, filed on Aug. 29, 2008, the disclosure of which is incorporated by reference in its entirety.

BACKGROUND OF INVENTION

1. Field of the Invention

This invention relates to superficially porous metal oxide particles and to methods for making them, as well as to separation devices containing superficially porous particles.

2. Background Art

Superficially porous metal oxides, particularly silica particles, are used in chromatography columns to separate mixed substances from one another, as well as in other applications. Such particles consist of a nonporous core with an outer porous shell. High performance liquid chromatography ("HPLC") columns containing superficially porous silica particles have short mass transfer distances, resulting in fast mass transfer; and thus fast separation.

U.S. Patent Publication No. 2007/0189944, by Kirkland et al., describes three conventional methods to prepare superficially porous silica particles. The first method is a spray-drying method, wherein solid silica particles or cores are mixed with a silica sol, and the mixture is sprayed under high pressure through a nozzle into a drying tower at high temperature (e.g., 200° C.). Unfortunately, the particles made this way often are incompletely or un-homogeneously coated. Such particles invariably also contain significant concentrations of unwanted totally porous particles of similar size, which come from the sol. Elutriation-fractionation of this product often fails to remove the totally porous contaminating particles, making the spray-drying approach less than optimal for producing the desired particles. In addition, the spray drying method can only make particle sizes larger than 5 µm, most in 30-100 µm range, and such particles have broad particle size distributions.

A second conventional method is "multilayer technology," in which solid silica cores are repeatedly coated with layers of colloidal particles by alternating layers of oppositely charged nanoparticles and polymers containing amino-functional groups until the particles reach the desired sizes. Such methods are described in U.S. Pat. No. 3,505,785, issued to Kirkland, and U.S. Patent Publication No. 2007/0189944, by Kirkland et al. Even at its best, the process is labor intensive, and very difficult to practice. When such a method is applied on small cores with size less than 2 µm, the final particle surface tends to become less spherical and rougher. The process generates a lot of different types of aggregated particles, resulting in loss of yield of the desired particles.

A third conventional method involves coacervation. In this method, solid silica spheres are suspended in silica sol under acidic conditions. A coacervate of urea-formaldehyde polymer and ultra-pure silica sol is thus formed and becomes coated on the solid spheres (see, e.g., Kirkland, Journal of Chromatography A, 890 (2000) 3-13). The urea-formaldehyde polymer is then removed by burning at 540° C., and the particles are then strengthened by sintering at an elevated temperature. This procedure is much simpler and more practical compared to the multilayer technology described above. However, the coacervation method has its drawbacks. One is that some of the solid particles often are not coated, leaving non porous particles in the finished product. Another is that much smaller totally porous particles are formed along with the coated and uncoated particles. This latter drawback necessitates further classification of totally porous particles and superficially porous particles.

Thus, conventional methods of preparing superficially porous silica particles all use silica nanoparticles as the building blocks, on which an outer porous shell is added. As a result, the porous shell has randomly distributed pores with wide pore size distribution. Moreover, the resulting rough external particle surfaces limit the performance of columns containing such particles at high flow rates by generating an unusually high film mass transfer resistance. Rough surfaces also limit the packing density because of increased friction forces among particles during the packing process (Gritti, et al., J. Chromatogr. A, 1166 (2007) 30-46).

Micelle-templated silica synthesis of totally porous silica particles through pseudomorphic transformation has been reported (see e.g. Martin, Angew. Chem. Int. Ed., 41 (2002) 2590). In contrast with the earlier techniques, where pores are randomly distributed, micelle-templated synthesis produces a more ordered pore framework involving preformed micellar structures via a liquid crystal templating mechanism (see, Kresge, Nature, 359, 710 and U.S. Pat. No. 5,057,296).

Pseudomorphism is a term used by mineralogists to describe phase transformation that does not change the shape of a material. Thus, the pseudomorphic synthesis mentioned here, assisted by a surfactant, for totally porous pre-shaped silica particles reportedly forms a highly ordered narrow mesopore size distribution, high surface area and pore volume without changing the initial shape of silica particles. The high specific surface area, high pore volume, and adjustable pore size should improve the retention capacity and molecular selectivity, as well as provide an overall improvement in mass transfer between the stationary and mobile phase.

Lefevre reportedly synthesized 10 µm totally porous silica particles with pore diameters ranging from 7 to 9 nm, specific surface areas of 900 m$^2$/g, and pore volumes of 1.5 ml/g (see, "Synthesis of Large-Pore Mesostructured Micelle-Templated Silicas as Discrete Spheres," Chem. Mater., 2005, 17, 601-607). The synthesis started with totally porous silica particles as a starting material in a sealed autoclave in a basic solution at above the boiling point of water from several hours to days, where the solution contained a micelle agent such as cetyltrimethylammonium bromide and a swelling agent such as trimethyl benzene. After the reaction, the micelle and swelling agents were removed by burning them off. However, they reported that large pore, totally porous silica particles with a particle size smaller than 8 µM cannot be made by this method due to particle aggregation. They also reported that particle explosion can occur if the pore volume of the totally porous silica starting material is too low. Thus, they start with totally porous particles (pore volume larger than 0.7 cm$^3$/g) and produce totally porous particles with a more ordered pore structure and higher surface area than the starting material.

Hybrid (i.e., covalent bonding between the organic and inorganic components within the material) totally porous silica particles have become popular as an HPLC packing material for HPLC columns because of their stability at high pH as well as their high physical strength. One method to prepare hybrid totally porous silica particles uses emulsion polymerization of an organic siloxane polymer precursor in the emulsion droplets in the presence of PEG or toluene as a porogen, in which the siloxane polymer precursor is substituted with organic moieties. PEG or toluene is later washed out, eliminating the need of any high temperature burn-off. Examples of such particles are disclosed in U.S. Pat. Nos. 4,017,528, 6,686,035, and 7,223,473, and in WO2006039507.

While these prior art approaches provide superficially porous silica particles, there is a need to make both hybrid and non-hybrid superficially porous silica particles with a narrow particle size distribution, narrow pore size distribution, high specific surface area and a porous outer layer for faster separation, lower chromatography column pressure drop, and higher efficiency, together with stability at high pH and with good mechanical strength under chromatography conditions.

SUMMARY OF INVENTION

One aspect of this invention relates to methods for making superficially porous particles. A method in accordance with one embodiment of the invention comprises subjecting substantially solid metal oxide particles selected from silica, alumina, zirconia, or titania, in an aqueous solution to agitation for a time and a pH sufficient to pseudomorphically transform said particles, in the presence of one or more surfactants.

Preferably, a process of this invention further comprises refluxing the particles and surfactant in the presence of a swelling agent.

Another aspect of this invention relates to superficially porous particles, which may comprise:
(a) solid cores having a size ranging from about 20% to about 99% of the size of the entire particles;
(b) substantially porous outer shells having ordered pores with a median pore size range from about 15 to about 1000 Å with a pore size distribution (one standard deviation) of no more than 50% of the median pore size;
(c) wherein the particles have a specific surface area of from about 5 to about 1000 m$^2$/g;
(d) wherein the particles have a median size range from about 0.5 µm to about 100 µm with a particle size distribution (one standard deviation) of no more than 15% of the median particle size; and
(e) wherein the particles comprise a metal oxide selected from silica, alumina, titania or zirconia.

Preferably, the superficially porous particles of this invention may comprise an organically modified hybrid of one or more of said metal oxides.

Another aspect of the invention relates to superficially hybrid particles. Superficially porous particles of the invention may include solid cores that each contain an inorganic material or a hybrid material, said hybrid material including an inorganic material and an organic material; and porous outer shells each include the inorganic material or the hybrid materials and having ordered pores, wherein the ordered pores have a median pore size ranges from about 15 to about 1000 Å with a pore size distribution (one standard deviation) of no more than 50% of the median pore size and produce at least one X-ray diffraction peak between 0.01° and 10° of a 2θ scan range; wherein the particles have a median size range from about 0.5 µm to about 100 µm with a particle size distribution (one standard deviation) of no more than 15% of the median particle size, wherein the inorganic material comprises a metal oxide selected from silica, alumina, titania or zirconia.

In accordance with some embodiments of the invention, the solid cores each comprise the inorganic material and the porous outer shells each comprise the inorganic material. In accordance with some embodiments of the invention, the solid cores each comprise the inorganic material and the porous outer shells each comprise the hybrid material. In accordance with some embodiments of the invention, the solid cores each comprise the hybrid material and the porous outer shells each comprise the inorganic material. In accordance with some embodiments of the invention, the solid cores each comprise the hybrid material and the porous outer shells each comprise the hybrid material, wherein the hybrid material includes an inorganic material and an organic material.

In accordance with embodiments of the invention, the ordered pores may be elongated pores aligned substantially in a radial direction. In this description, a "radial direction" refers to the direction normal to the surface of the particle. The particles may have a specific surface area of from about 5 to about 1000 m$^2$/g. The median size of the particles may be from about 0.5 µm to about 10 µm. The particles may have solid cores having a size ranging from about 20% to about 99% of the size of the entire particles, preferably 30%-99%, more preferably 50%-99%, more preferably 60%-99%, more preferably 70%-99%, and most preferably 80-99%. Note that any numerical range in this description is intended to include all numbers between the upper and lower limits, as if these intermediate numbers have been individually disclosed.

In accordance with embodiments of the invention, the organic material may be covalently attached to the metal oxide and the particles have a composition selected from: $MO_2/(R^1_pR^1_qMO_t)_n$ or $MO_2/[R^2(R^1_rMO_t)_m]_n$, wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

In accordance with embodiments of the invention, the superficially porous particles may be surface modified with a surface modifier having the formula $Z_a(R')_bSi$—R, where Z is selected from Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

Another aspect of the invention relates to methods for making superficially porous hybrid particles. A method for making such hybrid particles in accordance with one embodiment of the invention includes the steps of: subjecting substantially solid particles in an aqueous solution to agitation for a time and a pH sufficient to pseudomorphically transform the hybrid particles, in the presence of one or more surfactants, to produce the superficially porous hybrid particles, wherein the solid particles each comprise a metal oxide or an organic material covalently linked to a metal oxide, wherein the metal oxide is selected from, silica, alumina, zirconia, or titania. The aqueous solution may further include a swelling agent. The method may further include subjecting the superficially porous hybrid particles to a pore expansion treatment. The pore expansion treatment may include hydrothermal treatment or etching, which may involve high pH etching, low pH etching or specific ion etching.

In accordance with embodiments of the invention, the surfactants may be one selected from the group consisting of a polyoxyethylene sorbitan, a polyoxythylene ether, a block copolymer, an alkyltrimethylammonium, an alkyl phosphate, an alkyl sulfate, an alkyl sulfonate, a sulfosuccinate, a carboxylic acid, a surfactant comprising an octylphenol polymerized with ethylene oxide, and a combination thereof.

In accordance with embodiments of the invention, the swelling agent may be selected from an alkyl substituted benzene, a dialkylamine, a trialkylamine, a tetraalkyl ammonium salt, an alkane of the formula $C_nH_{2n+2}$, a cycloalkane of the formula $(C_nH_{2n})$, a substituted alkane of the formula $(X-C_nH_{2n+1})$, or a substituted cycloalkane of the formula $(X-C_nH_{2n-1})$, wherein n is an integer of 5-20, and X is chloro-, bromo-, or —OH.

A further aspect of this invention includes separation devices that employ superficially porous particles of this invention.

The process and product of this invention are quite different from prior efforts. The superficially porous particles of this invention made from pseudomorphic synthesis of this invention keep generally the same size and morphology as the starting solid metal oxide particles, while prior art methods coat a porous layer onto the solid cores, in which the final superficially porous particle size and particle size distribution increase. Because we can make substantially monodispersed solid particles for the starting metal oxide materials, the resulting superficially porous metal oxide particles made by a process of this invention would be a superficially porous metal oxide particle product that remains substantially monodispersed (as shown in FIG. 5). Because the pores are formed by micelle-templating, the superficially porous particles in this invention may have a narrow pore size distribution (as shown in FIG. 2) and ordered pore structures (as shown in FIG. 3). Moreover, the starting solid particles may be converted into hybrid superficially porous particles by adding an organic metal alkoxide during the process (as shown in Example 7). All of these characteristics represent good properties for chromatographic packing materials, among other things.

Other aspects and advantages of the invention will be apparent from the following description and the appended claims.

DETAILED DESCRIPTION

Figure 1:
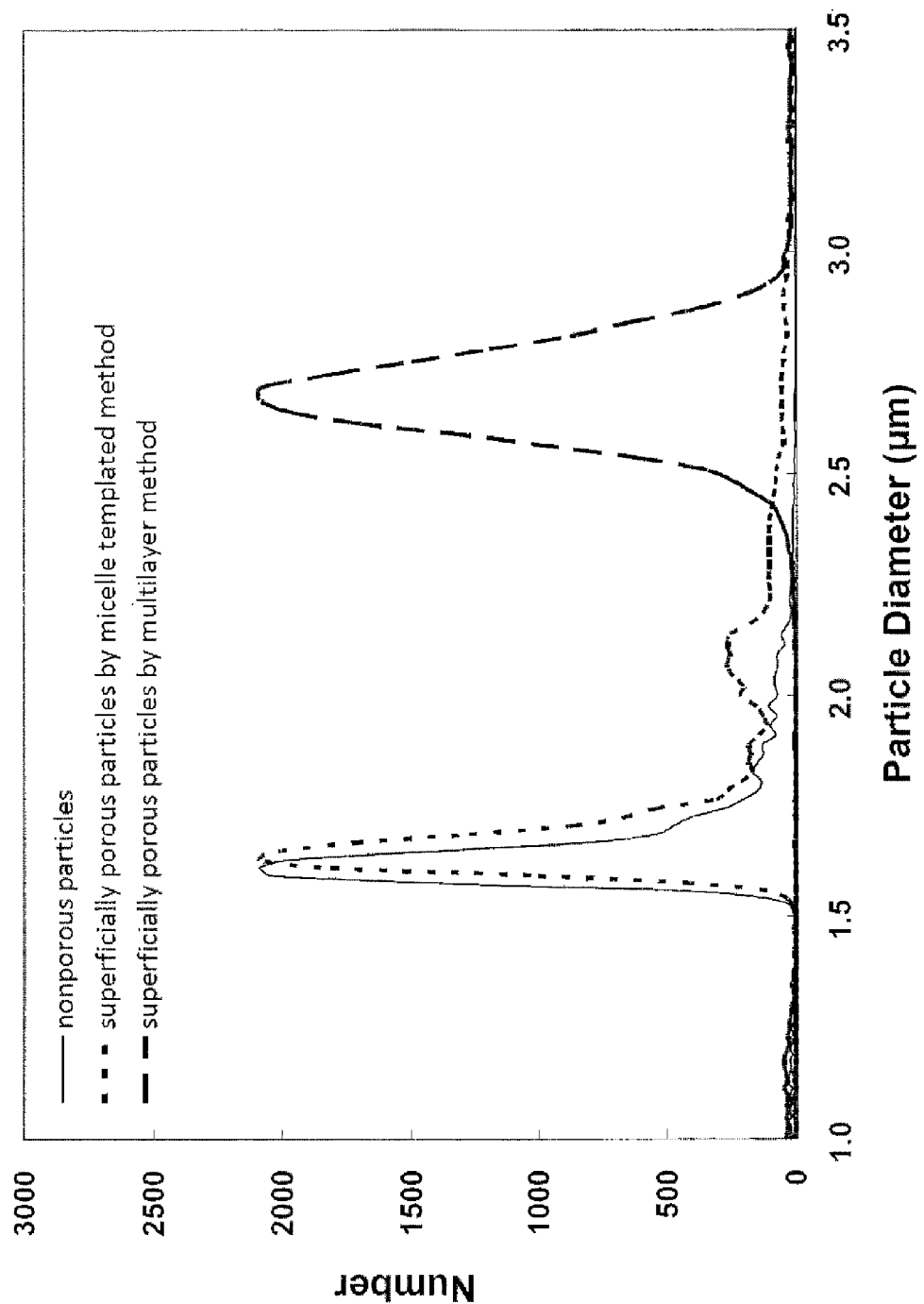
FIG. 1 is a chart of particle size distribution of nonporous silica particles and superficially porous particles made by micelle-templated method (Example 7 below) as well as multilayer method.

Embodiments of this invention relate to novel superficially porous metal oxide particles and methods for making such superficially porous metal oxide particles. In accordance with embodiments of the invention, superficially porous metal oxide particles have narrow particle size distributions, narrow pore size distributions, and/or ordered pore structures. Superficially porous particles of the invention may be pure inorganic (non-hybrid) or hybrid (i.e., inorganic and organic hybrid) particles. In addition, the cores and the superficial layers may independently comprise hybrid or non-hybrid materials. Thus, a particle of the invention may have a solid core and a superficial porous layer having the following combinations: non-hybrid core and non-hybrid superficial porous layer, non-hybrid core and hybrid superficial porous layer, hybrid core and non-hybrid superficial porous layer, and hybrid core and hybrid superficial porous layer.

In accordance with embodiments of the invention, non-hybrid solid particles (i.e., comprising of metal oxide materials only) may be pseudomorphically transformed into particles having non-hybrid cores and non-hybrid superficial porous layers. If the pseudomorphic transformation is conducted in the presence with an organic modifier, then particles with non-hybrid cores and hybrid peripheral porous layers may be produced. That is, particles having non-hybrid inorganic cores and hybrid (inorganic and organic hybrid) superficial porous layer may be prepared from inorganic solid particles by adding organic components (organic modifiers) during pseudomorphic transformations.

In accordance with some embodiments of the invention, particles having inorganic and organic hybrid cores and superficial layers may be prepared using hybrid solid particle starting materials. For example, such hybrid solid cores may be subjected to pseudomorphic transformation to produce the desired superficially porous layers having inorganic and organic hybrid compositions.

In accordance with some embodiments of the invention, particles having a hybrid core and inorganic superficial layers may be similarly prepared. First, one would make solid articles having a hybrid core (comprising organic and inorganic materials) with a solid inorganic outer layer. These particles may be prepared with any suitable methods known in the art. The sizes for both the hybrid core and the inorganic layer can be precisely controlled with the current core recipes. Then, one would place the particles under a milder condition (such as lower pH) where only inorganic outer layer dissolves and transforms because the hybrid inner core has a much better pH resistance.

In accordance with embodiments of the invention, pseudomorphic transformation may be performed with micelle templates to produce ordered pore structures. In accordance with some embodiments of the invention, the pseudomorphic transformation may be performed in the presence of a swelling agent to increase the pore diameter formed by the micelle templates.

In accordance with embodiments of the invention, the superficially porous hybrid particles produced from pseudomorphic transformation may be further modified to produce the desired properties. For example, the superficially porous hybrid particles may be subjected to pore enlarging treatments to provide particles with larger pores. Pore enlarging treatments may use any suitable methods known in the art, such as hydrothermal treatments (or hydrothermal swelling) or etching. The etchings may use base (high pH) or acid (low pH) or other suitable chemicals (e.g., hydrofluoric acid or fluoride ions for etching silica particles).

The starting materials used to make the novel metal oxide particles of this invention may be monodispersed solid metal oxide particles that can be made by known processes (see, e.g., U.S. Pat. Nos. 3,634,588, 4,775,520, and 4,983,369) or by sintering porous particles at high temperatures (such as 1100° C.) to proper sizes to form solid particles.

The term "solid particles" refer to particles having a low pore volume (i.e., <0.005 cm$^3$/g). Such solid particle starting materials may be pure or substantially pure metal oxide particles, or they may be organically modified hybrids of one or more of said metal oxides. For example, if the metal oxide is silica, hybrid silica refers to a material having the formula $SiO_2/(R^1_p R^2_q SiO_t)_n$ or $SiO_2/[R^3(R^1_r SiO_t)_m]_n$; wherein $R^1$ and $R^2$ are independently a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^3$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100.

In accordance with methods of the invention, such metal oxide particles may be dissolved at a pH and for a time and temperature under agitation in the presence of a surfactant so as to produce superficially porous particles having a relatively monodispersed particle size distribution and a relatively narrow pore size distribution. Preferably, the substantially solid metal oxide particles have a median particle size from about 0.5 μm to about 100 μm and a particle size distribution of no more than 15% of the median size, more preferably, a particle size distribution of no more than 10% of the median size, and most preferably a distribution of no more than 5% of the median size.

It is well known that metal oxides of silica, alumina, zirconia, and titania can be dissolved in either a strong basic solution or a strong acidic solution, depending on the metal oxide. For example, silica can be dissolved in a high pH solution, such as sodium hydroxide or ammonia solution, or in a hydrofluoric acid solution. In accordance with a process of this invention, such monodisperse solid metal oxide particles are only partially dissolved. As such, the pH range may be broader for partial dissolution, as compared to complete dissolution.

For example, in the case of alumina solid particles, acidic pH may be used for dissolution of alumina (and negatively charged surfactants or non-ionic surfactants may be used to form pores). Where the solid particles comprise silica, the solution may contain fluoride ion, such as hydrofluoric acid or ammonium fluoride, for partial dissolution. For example, silica may be partially dissolved in the presence of hydrofluoric acid at a concentration from 50 ppm to 5000 ppm. When such an acid is used, the concentration of hydrofluoric acid is preferably 200 to 800 ppm. Alternatively, the solid silica particles can be partially dissolved where the pH of the solution is basic from about pH 10 to about pH 13.5, more preferably from about pH 12 to about pH 13.5. The base used to achieve such basic pH is preferably one such as ammonium hydroxide.

As far as a sufficient temperature for a process of this invention, the solution is either heated under reflux or in an autoclave at a temperature higher than about 50° C. from one hour to seven days, preferably under reflux. The term "under reflux" refers to a technique where the solution, optionally under stirring, inside a reaction vessel is connected to a condenser, such that vapors given off by the reaction mixture are cooled back to liquid, and sent back to the reaction vessel. The vessel can then be heated at the necessary temperature for the course of the reaction. The purpose is to accelerate the reaction thermally by conducting it at an elevated temperature (i.e., at the boiling point of the solvent). The advantage of this technique is that it can be left for a long period of time without the need to add more solvent or fear of the reaction vessel boiling dry as the vapor is condensed in the condenser and returned to the reaction vessel. In addition, as a given solvent will always boil at a certain temperature, one can be sure that the reaction will proceed at a fairly constant temperature within a narrow range. In this invention, it is preferred to reflux the mixtures described above for less than about 7 days, preferably at least one hour, more preferably from about 2 to about 72 hours at a temperature of from about 75 to about 110° C., more preferably from about 85 to about 100° C.

The term "agitation" refers to sufficient movement of the solution/mixture containing the particles so that the particles do not settle or agglomerate. Agitation can be done by stirring, sparging, sonicating, shaking, and the like. Stirring the mixture is preferred.

As mentioned previously, a process of this invention may utilize a surfactant. One or more ionic surfactants or non-ionic surfactants may be preferred. More preferably, a surfactant is selected from one or more of the group of polyoxyethylene sorbitans, polyoxythylene ethers, block copolymers, alkyltrimethylammonium, alkyl phosphates, alkyl sulfates, alkyl sulfonates, sulfosuccinates, carboxylic acid, surfactants comprising an octylphenol polymerized with ethylene oxide, and combinations thereof. Most preferably a surfactant(s) is selected from one or more of a compound of the formula $C_nH_{2n+1}(CH_3)_3N^+X^-$, wherein $X^-$ is selected from chloride or bromide, and n is an integer from 10 to 20. Preferred surfactants may include trimethyloctadecylammonium bromide and hexadecyltrimethylammonium bromide.

Preferably, this invention provides a method for making superficially porous silica particles by subjecting substantially monodisperse solid silica particles to a basic aqueous solution under reflux with a cationic surfactant. In accordance with embodiments of the present invention, superficially porous silica particles may be prepared using micelle-templated pseudomorphic synthesis. In accordance with one embodiment, solid silica cores are treated in a basic solution containing surfactants that form micelles and one or more swelling agents, under reflux conditions for a duration from at least one hour to seven days. The outer layer of the solid cores is dissolved and re-precipitates to form a porous layer during a pseudomorphic transformation.

In this description, the term "pseudomorphic transformation" or "pseudomorphically transform" refers to a process that allows the metal oxide particles in question to be dissolved on their surfaces as the solid oxide surface is being replaced with a superficially porous shell at the same time such that the final superficially porous particles keep substantially the same general sizes as the original solid particles, and thus retain the substantially monodispersed characteristic of the original starting material solid particles after pseudomorphic synthesis. Preferably, the superficially porous particles have solid cores having a size ranging from about 50% to about 90% of the size of the entire particles, most preferably from about 60% to about 80% of the size of the entire particles.

In a process of this invention, an organic metal alkoxide molecule may be added to the solution so as to form an organically modified hybrid metal oxide in the superficial pores on the particles. Preferably, an organic metal alkoxide is selected from one or more of the formulae MV:

$$(RO)_3M-R^2-M(OR)_3 \quad (I)$$

$$(RO)_2R^1M-R^2-MR^1(OR)_2 \quad (II)$$

$$(RO)_3M-R^1 \quad (III)$$

$$(RO)_2M-R^1R^1 \quad (IV)$$

wherein for formulae I-IV: R is selected independently in each instance from methyl and ethyl, $R^1$ is independently selected in each instance from a substituted or unsubstituted $C_1$ to $C_{18}$ alkyl, alkenyl, alkynyl, or aryl group, wherein the substituents are selected from halogen, dial, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more M atoms; and M is selected from Si, Ti, and Zr.

When M is Si in Formulae MV, the organic metal alkoxide is preferably selected from one or more of methyltriethoxysilane, ethyltriethoxy silane, 1,2-bis(triethoxysilyl)methane, 1,2-bis(triethoxysilyl)ethane and 1,2-bis(triethoxysilyl)benzene.

Where M in formulae I-IV is Al, the organic metal alkoxide is selected from one or more of the formulae IX and X:

$$(RO)_2Al-R^2-Al(OR)_2 \quad (IX)$$

$$(RO)_2Al-R^1 \quad (X)$$

wherein R is selected independently in each instance from methyl and ethyl, $R^1$ is selected from a substituted or unsubstituted $C_1$ to $C_{18}$, alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more Al atoms.

A process of the invention preferably may employ a swelling agent that can dissolve into the surfactant micelles. The swelling agent may cause the micelles to swell, increasing (adjusting) the sizes of the pores to the desired sizes. Preferably, a mixture of a pH adjuster (a base or acid), solid silica (or other metal oxide) particles and a surfactant may be heated for a duration (e.g., 20 minutes to 1.5 hours) at a temperature of from 30 to 60° C. before the swelling agent is added. The mixture containing the swelling agent may be heated from 15 min to one month (but preferably less than about 7 days) at a temperature of from about 75 to about 110° C. Whereupon, the mixture may be preferably refluxed as described above.

Preferred swelling agents include, but are not limited to, an alkyl substituted benzene, a dialkylamine, a trialkylamine, a tertraalkyl ammonium salt, an alkane of the formula $(C_nH_{2n+2})$ where n is an integer of 5-20 (ref: Ulagappan, N., Chem. Commun., 1996), a cycloalkane of the formula $(C_nH_{2n})$ where n is an integer of 5-20, a substituted alkane of the formula $(X-C_nH_{2n+1})$ where n is an integer of 5-20 and X is chloro, bromo, or —OH, or a substituted cycloalkane of the formula $(X-C-H_{2n-1})$ where n is an integer of 5-20 and X is chloro-, bromo-, or —OH. More preferred swelling agents include trimethylbenzene (ref: Beck, J. S. U.S. Pat. No. 5,057,296); triisopropylbenzene (ref: Kimura, T.; Sugahara, Y.; Kuroda, K. J. Chem. Soc., Chem. Commun. 1998, 559); N,N-dimethylhexadecylamine, N,N-dimethyldecylamine, trioctylamine and tridodecylamine (Ref: Sayari, A.; Kruk, M.; Jaroniec, M.; Moudrakovski, I. L. Adv. Mater. 1998, 10, 1376); cyclohexane, cyclohexanol, dodecanol, chlorododecane and tetramethylammonium and tetraethylammonium bromide salts (Ref: Corma, A.; Kan, K.; Navarro, M. T.; Perez-Pariente, J.; Rey, F. Chem. Mater. 1997, 9, 2123).

The solid particles, the surfactant, and the optional swelling agent may be subjected to an elevated temperature in an aqueous solution, preferably under reflux. The micelles formed in the solution may cause the metal oxide dissolved from the partially dissolved metal oxide particles to re-deposit onto the partially dissolved particles due to the attraction of the dissolved metal oxide to the micelles. After the treatment, for example reflux, is complete, the particles are separated from the solution (e.g., by centrifugation, filtration, or the like), and the particles may be subjected to a treatment (e.g., with elevated temperature, solvent wash, or vacuum) to drive off (e.g., combust or volatilize) the surfactant and swelling agent from the particles. If the optional organosilane is bound (e.g., covalently) to the particles, the particles may be subjected to a solvent extraction treatment (e.g., agitating in ethanol/HCl with elevated temperature) to wash off the surfactant and swelling agent from the particles so that the organosilane may still remain bound after such treatment.

As mentioned previously, embodiments of this invention further relate to the superficially porous particles themselves described above. In addition to the above, the particles preferably have solid cores having a size ranging from about 50% to about 90% of the size of the entire particles, more preferably from about 60% to about 80% of the size of the entire particles. The superficially porous particles in accordance with embodiments of this invention may have a particle size distribution (one standard deviation) of 10% or less of the median particle size, more preferably of 5% or less of the median particle size. Further, the superficially porous particles of this invention may have a pore size distribution (one standard deviation) which is no more than 40% of the pore size median, more preferably no more than 30% of the pore size median.

Preferably, the superficially porous particles of this invention have a median size from about 0.5 μm to about 10 μm, more preferably from about 1.0 μm to about 5 μm. Preferably, the superficially porous particles of this invention have a pore size range from about 60 Å to about 800 Å, more preferably from about 70 Å to about 300 Å.

Preferably, the superficially porous particles of this invention have a specific surface area of the particles that is from about 5 m$^2$/g to about 300 m$^2$/g.

Preferably, the superficially porous particles comprise an organic metal oxide having a composition selected from formulae XI and XII:

$$MO_2/(R^1_p R^1_q MO_t)_n \qquad (XI)$$

$$MO_2/[R^2(R^1_r MO_t)_m]_n \qquad (XII)$$

wherein R$^1$ is independently selected in each instance from a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is a substituted or unsubstituted C$_1$ to C$_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

More preferably, in formulae XI and XII, M is Si and in that case R$^1$ and R$^2$ are preferably independently methyl, or ethyl; R$^3$ is methylene, ethylene or 1,2-benzylene. However, in formulae XI and XII, M can be Ti or Zr.

The superficially porous particles can also comprise an organic metal oxide having a composition selected from one or both of the formulae XIII and XIV:

$$Al_2O_3/(R^1AlO)_n \qquad (XIII)$$

$$Al_2O_3/[R^2(AlO)_m]_n \qquad (XIV)$$

wherein R$^1$ is a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is a substituted or unsubstituted C$_1$ to C$_7$ alkylene, alkenylene, alkynylene, or arylene, or polar embedded C$_1$ to C$_7$ alkylene, alkenylene, alkynylene, or arylene group moiety bridging two or more metal atoms; m is an integer greater than or equal to 2; and n is a number from 0.01 to 100.

Yet another aspect of this invention relates to superficially porous particles, comprising an organic metal oxide having a composition selected from one or more of formulae XVI-XIX:

$$MO_2/(R^1_p R^1_q MO_t)_x/(R^1_p R^1_q MO_t)_y \qquad (XVI)$$

$$MO_2/(R^1_p R^1_q MO_t)_x/[R^2(R^1_r MO_t)_m]_y \qquad (XVII)$$

$$MO_2/[R^2(R^2_r MO_t)_m]_x/(R^1_p R^1_q MO_t)_y \qquad (XVIII)$$

$$MO_2/[R^1(R^1_r MO_t)_m]_x/[R^2(R^1_r MO_t)_m]_y \qquad (XIX)$$

wherein R$^1$ is independently selected in each instance from a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is independently selected in each instance from a substituted or unsubstituted C$_1$ to C$_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and x and y each is independently a number from 0.01 to 100; and M is selected from Si, Ti, or Zr; with a median pore size range from about 15 to about 1000 Å; a specific surface area of from about 5 to about 1000 m$^2$/g; and a median size range from about 0.5 μm to about 100 μm.

To make superficially porous particles of formulae XVI-XIX from the starting materials of formulae XI and XII, the solid hybrid starting materials of Formulae XI and XII are pseudomorphically transformed in accordance with the method of this invention in the presence of one or more organic metal alkoxides of Formulae I-IV in the process. The resulting product is superficially totally porous particles, comprising an organic metal oxide having a composition selected from one or more of Formulae XVI-XIX where the particles have:

(a) a median pore size range from about 15 to about 1000 Å;

(b) a specific surface area of from about 5 to about 1000 m$^2$/g; and (c) a median size range from about 0.5 μm to about 100 μm Yet another aspect of this invention relates to superficially porous particles, comprising an organic metal oxide having a composition selected from one or more of formulae XX-XXIII:

$$Al_2O_3/(R^1AlO)_x/(R^1AlO)_y \qquad (XX)$$

$$Al_2O_3/[R^2(AlO)_m]_x/(R^1AlO)_y \qquad (XXI)$$

$$Al_2O_3/(R^1AlO)_x/[R^2(AlO)_m]_y \qquad (XXII)$$

$$Al_2O_3/[R^2(AlO)_m]_x/[R^2(AlO)_m]_y \qquad (XXIII)$$

wherein R$^1$ is independently selected in each instance from a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is independently selected in each instance from a substituted or unsubstituted C$_1$ to C$_7$ alkylene, alkenylene, alkynylene, or arylene group moiety bridging two or more Al atoms; m is an integer greater than or equal to 2; and x and y each is independently a number from 0.01 to 100; with a median pore size range from about 15 to about 1000 Å; a specific surface area of from about 5 to about 1000 m²/g; and a median size range from about 0.5 μm to about 100 μm.

To produce superficially porous particles of Formulae XX-XXIII, one can start with substantially solid hybrid solid particles of the Formulae XXIV and XXV:

$$Al_2O_3/(R^1AlO)_n \quad (XXIV)$$

$$Al_2O_3/[R^2(AlO)_m]_n \quad (XXV)$$

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100.

To make the superficially porous particles of formulae XX-XXIII from the solid hybrid particle starting material of formulae XXIV and XXV, the solid hybrid starting materials of Formulae XXIV and XXV are pseudomorphically transformed in accordance with a method of this invention in the presence of one or more organic metal alkoxides of Formulae XXVI and XXVII:

$$(RO)_2Al-R^3-Al(OR)_2 \quad (XXVI)$$

$$(RO)_2Al-R^1 \quad (XXVII)$$

wherein R is selected independently in each instance from methyl and ethyl, $R^1$ is selected from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^3$ is selected from a substituted or unsubstituted $C_1$ to $C_7$ alkylene, alkenylene, alkynylene, or arylene group bridging two or more Al atoms.

The alkoxides of Formulae XXVI and XXVII are either commercially available or can be made as taught in standard organometallic synthetic methods.

The resulting products from the reaction are superficially porous particles, comprising an organic metal oxide having a composition selected from one or more of Formulae XX-XXIII with a median pore size range from about 15 to about 1000 Å; a specific surface area of from about 5 to about 1000 m²/g; and a median size range from about 0.5 μm to about 100 m²/g.

The above description shows how particles having non-hybrid cores and non-hybrid or hybrid (i.e., organic and inorganic hybrid) superficially porous layers may be prepared from inorganic core particles—i.e., by performing pseudomorphic transformations in the absence or presence of one or more organic modifiers. In accordance with other embodiments of the invention, hybrid superficially porous particles may also be prepared starting from hybrid cores to produce particles having hybrid cores and hybrid superficially porous layers. To obtain such particles, the hybrid core particles may be subjected to the pseudomorphic transformation to provide superficially porous hybrid particles. Furthermore, such pseudomorphic transformation may also be performed in the presence of one or more organic modifiers to increase the concentration or to alter the compositions of organic modifiers in the superficially porous layer.

The term "hybrid" as used herein refers to the particles containing both inorganic and organic materials. The inorganic materials are the metal oxides, such as oxides of silica, alumina, zirconia, and titania. In a hybrid particle or core, the organic material is covalently linked with metal oxides. The organic materials may be represented as the R, $R^1$, or $R^2$ groups in formulae (I)-(XXVII) described above.

The hybrid cores to be used in the transformations may be from commercial sources or prepared according to methods known in the art. For example, U.S. Pat. No. 4,775,520, issued to Unger et al., discloses methods for preparing highly monodispersed nonporous spherical $SiO_2$ particles, which have mean particle diameters between 0.05 and 10 pm with a standard deviation of not more than 5%. This patent is incorporated by reference in its entirety. This and similar methods may be used to prepare hybrid cores for use with embodiments of the invention. Preferably, the hybrid cores used in the transformation are solid cores.

For example, methods for preparing hybrid core particles that contain one or more type of organic modifiers (see e.g., Example 9) may be used to prepare solid cores in accordance with embodiments of the invention. For example, an organic modifier (e.g., bistrimethoxysilylethyl benzene) may be reacted with $NH_4OH$ in water at an elevated temperature (e.g., 60° C.) to produce solid cores having desired particle sizes (e.g., an average diameter on the order of 1 μm).

Similarly, methods for preparing a mixed hybrid core particles containing two or more different organic modifiers in a selected ratio may be used (see e.g., Example 10). For example, tetraethyl orthosilicate (TEOS) and 1,2-bis(triethoxy)silylethane (BES) may be heated with $NH_4OH$ in a water-alcohol solution to produce hybrid cores with a predetermined ratio of the two organic modifiers. Other mixed hybrid core particles may be similarly prepared.

Figure 6:
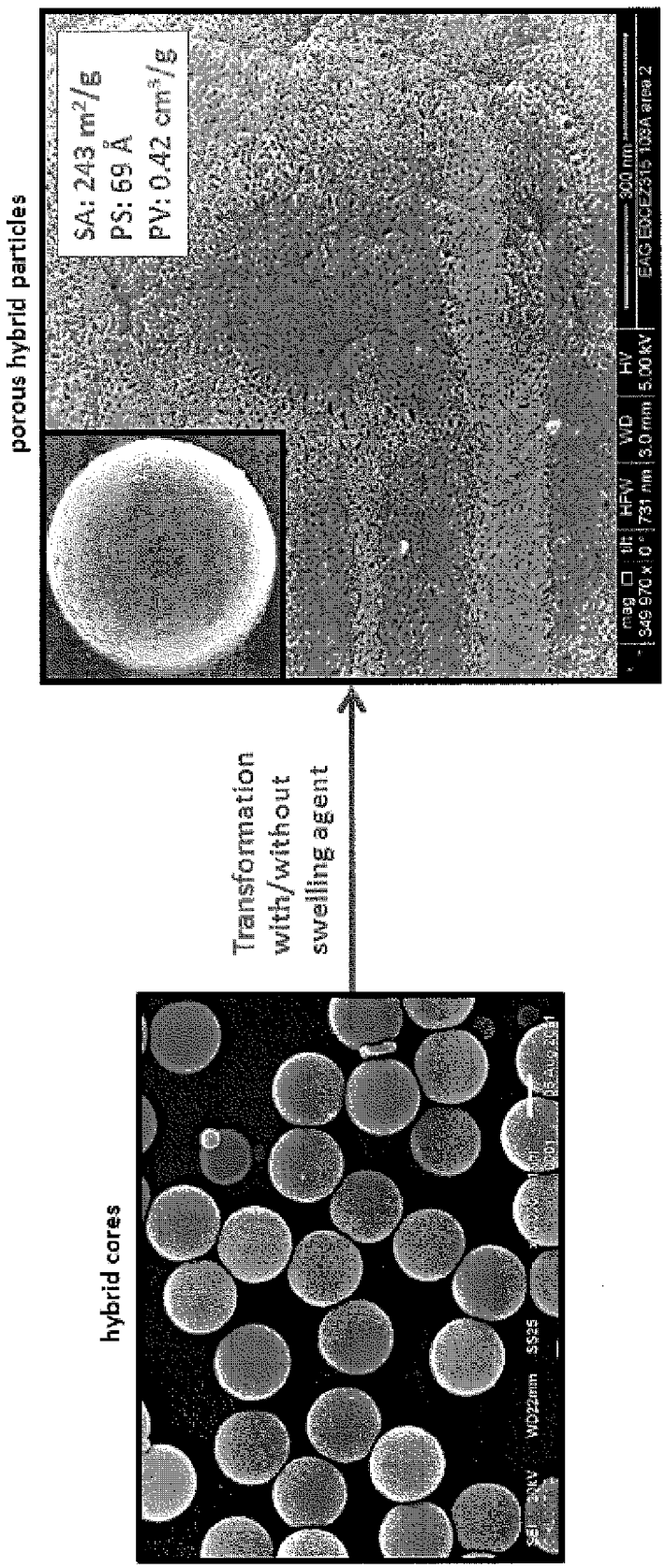
FIG. 6 shows a schematic illustrating transformation of hybrid core particles to produce superficially porous hybrid particles. The SEM images of the hybrid cores and the porous hybrid particles are shown.

In accordance with embodiments of the invention, these hybrid core particles may be transformed pseudomorphically to produce superficially porous hybrid particles. As illustrated in FIG. 6, the transformation may be performed with or without a swelling agent. As noted above, swelling agents may be added to the transformation process to increase the pore sizes, if desired.

EXAMPLE 10 (described later) shows one example of a transformation without a swelling agent. For example, the hybrid core particles may be heated with a surfactant (e.g., $C_{18}TAB$) and a base (e.g., $NH_4OH$) at an elevated temperature for a duration to cause pseudomorphic transformation of the outer layers of the hybrid core particles. The superficially porous particles were then collected (e.g., by filtration or centrifugation). The surfactants may be removed with solvent extraction. A TEM image of these particles is shown in FIG. 9(A).

Figure 9:
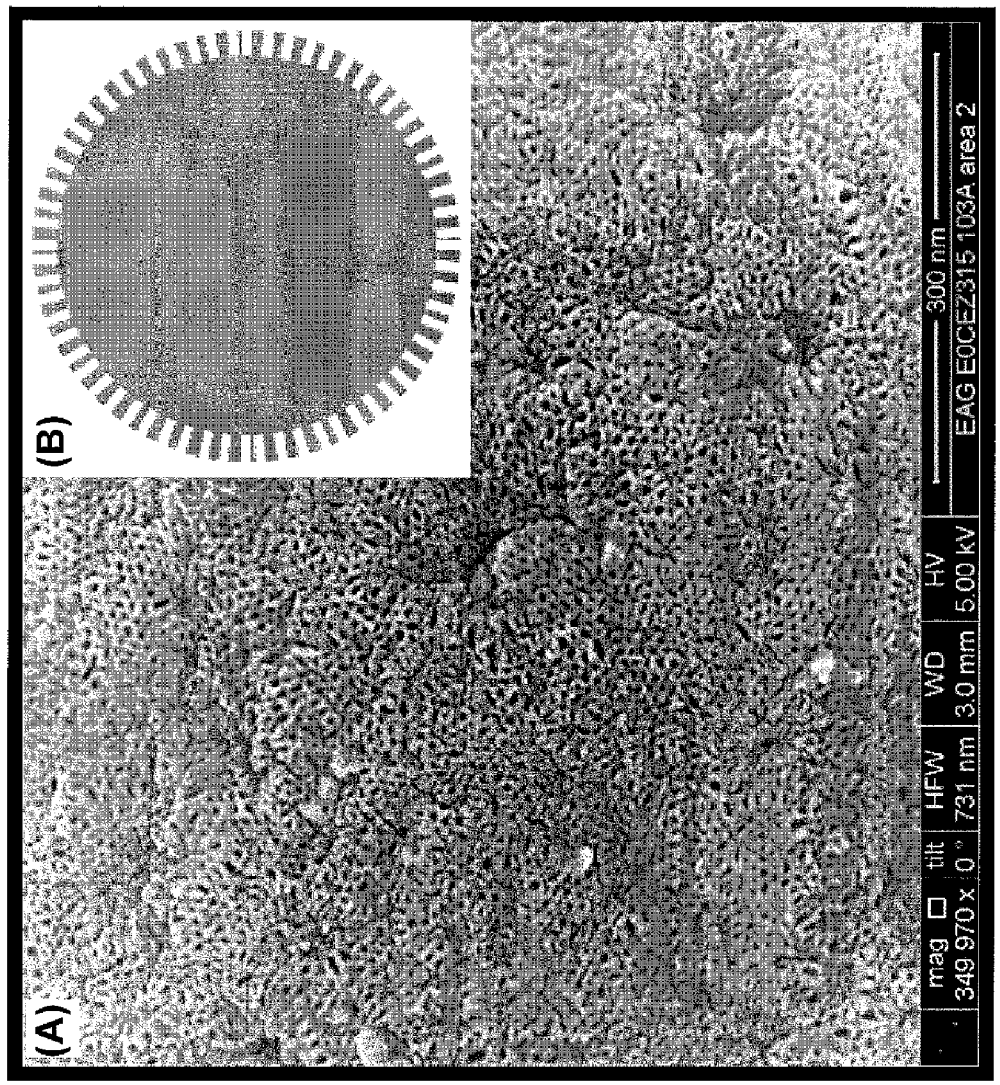
FIG. 9(A) shows a high resolution SEM image of the surface of hybrid particles made in EXAMPLE 10 (below) showing a pore arrangement and order consistent with the structure illustrated in FIG. 9(B).
FIG. 9(B) shows a diagram illustrating a structure of the superficially porous hybrid particle in accordance with one embodiment of the invention.

As shown in FIG. 9(A), the pores in the outer layers of the superficially porous hybrid particles of the invention are highly ordered. In addition, these pores are substantially elongated pores aligned in a substantially radial (normal to the surface) direction. As used herein, the "radial direction" is the direction normal to the surface of a sphere. The ordered structures produce strong peaks in XRD in 2θ scan between 0.01 and 10 degrees.

Figure 2:
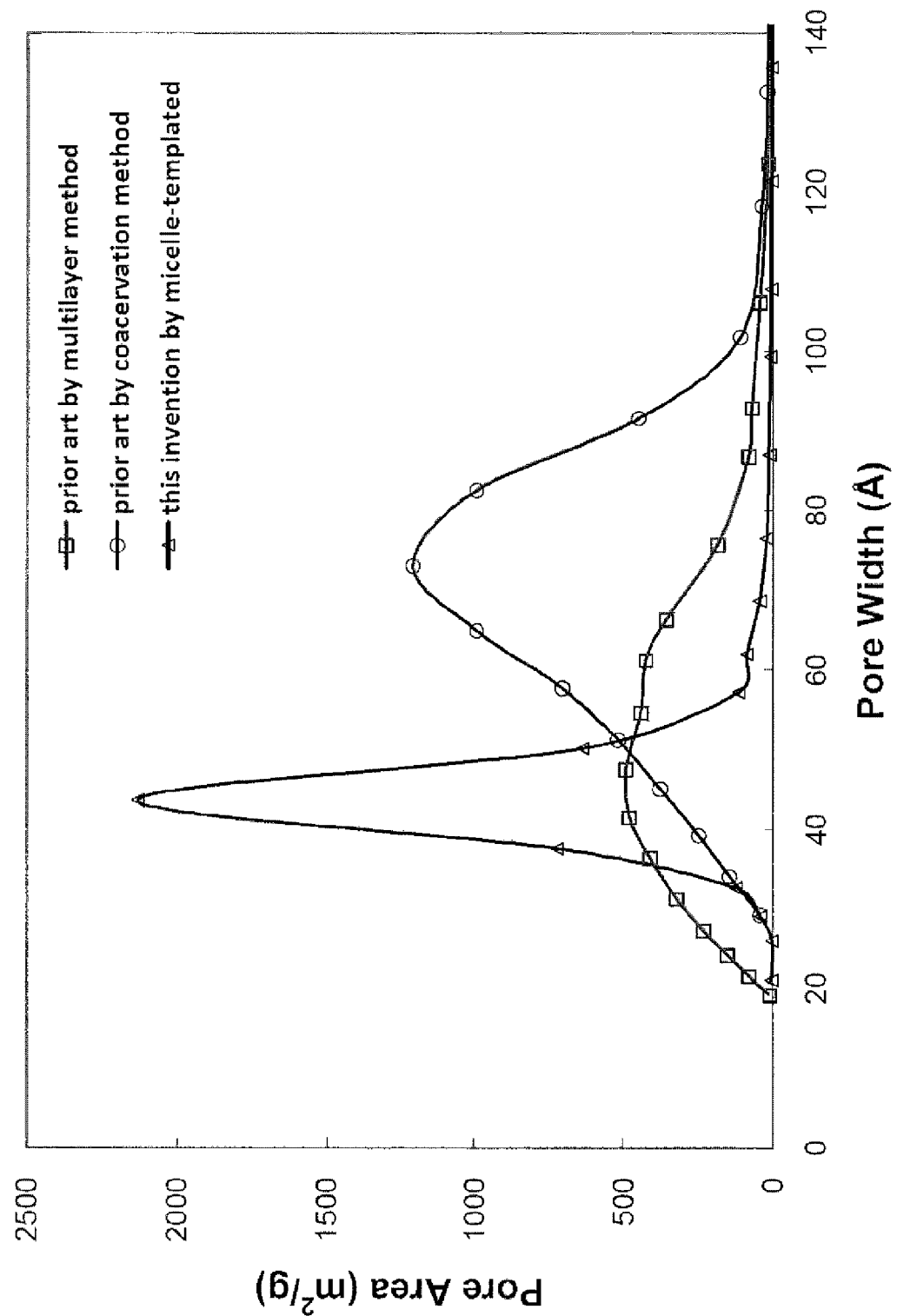
FIG. 2 is a chart of pore size distribution of superficially particles made by multilayer, coacervation and micelle-templated (Example 5 below) methods.

This radial (i.e., normal to particle surface) alignment of elongate pores is unique, as compared to the prior art particles. For example, particles produced by multiple layer coating techniques of Kirkland show random configurations of the pores (see, FIGS. 1 and 2 in U.S. Patent Publication No. 2007/0189944), while particles disclosed in Wyndham et al. (U.S. Patent Application Publication No. 2008/0269368) show elongated pores lying in directions parallel to the surface of the particles.

Figure 11:
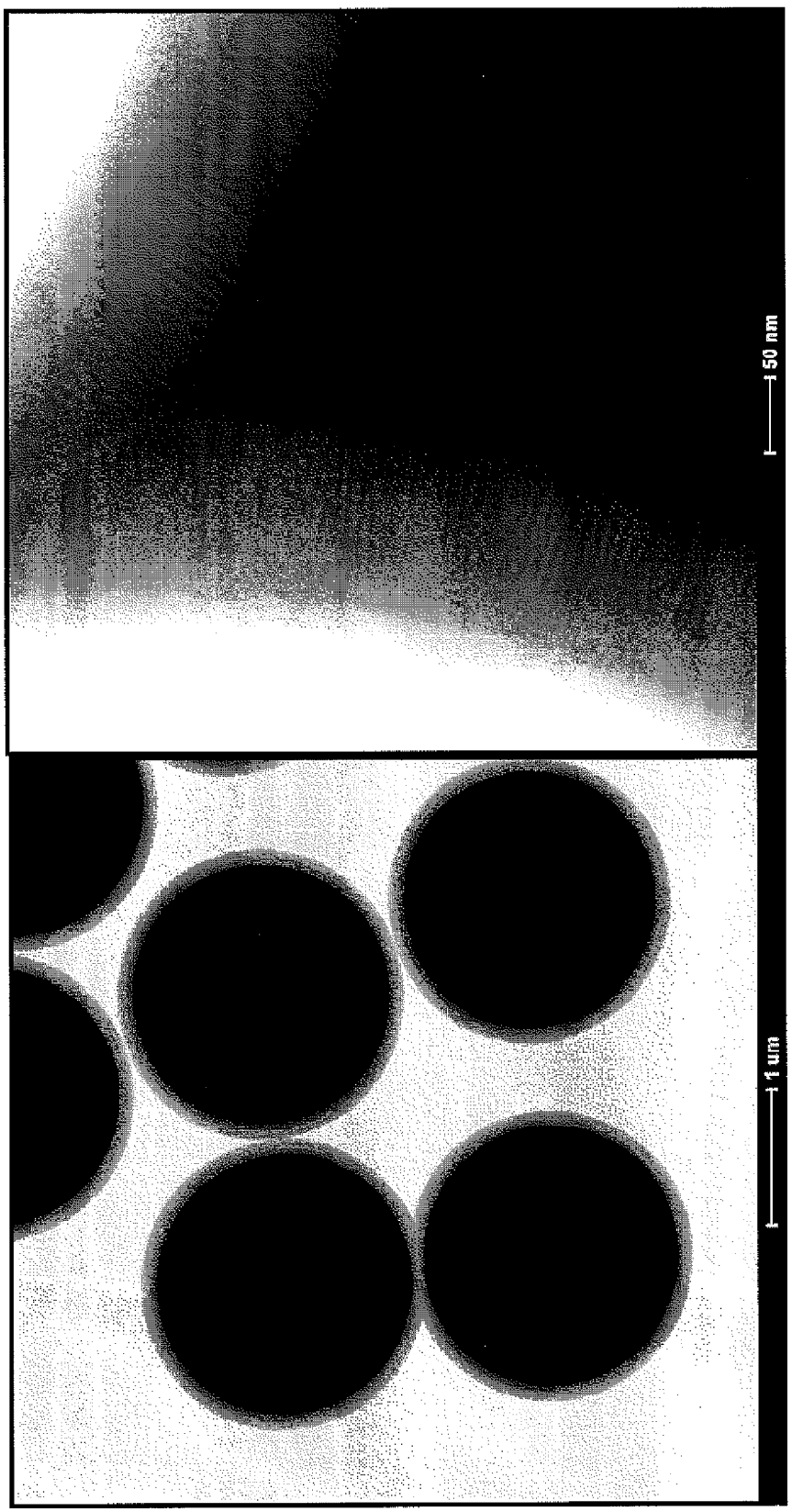
FIG. 11(A) shows a TEM image of particles of EXAMPLE 11 (below) prepared with a swelling agent in the pseudomorphic transformation in accordance with one embodiment of the invention.
FIG. 11(B) shows a TEM image of one such particle.

EXAMPLE 11 (described later) shows a pseudomorphic transformation in the presence of a swelling agent. Briefly, hybrid core particles are heated in the presence of a surfactant (e.g., $C_{18}TAB$) and a swelling agent (e.g., tridecane) at an elevated temperature for a duration to cause the outer layers of the hybrid core particles to be transformed into superficially porous hybrid layers. The product particles may be collected by filtration or centrifugation, and the surfactant and the swelling agents maybe removed with solvent extraction or wash. SEM images of these particles are shown in FIGS. 11(A) and 11(B).

Figure 7:
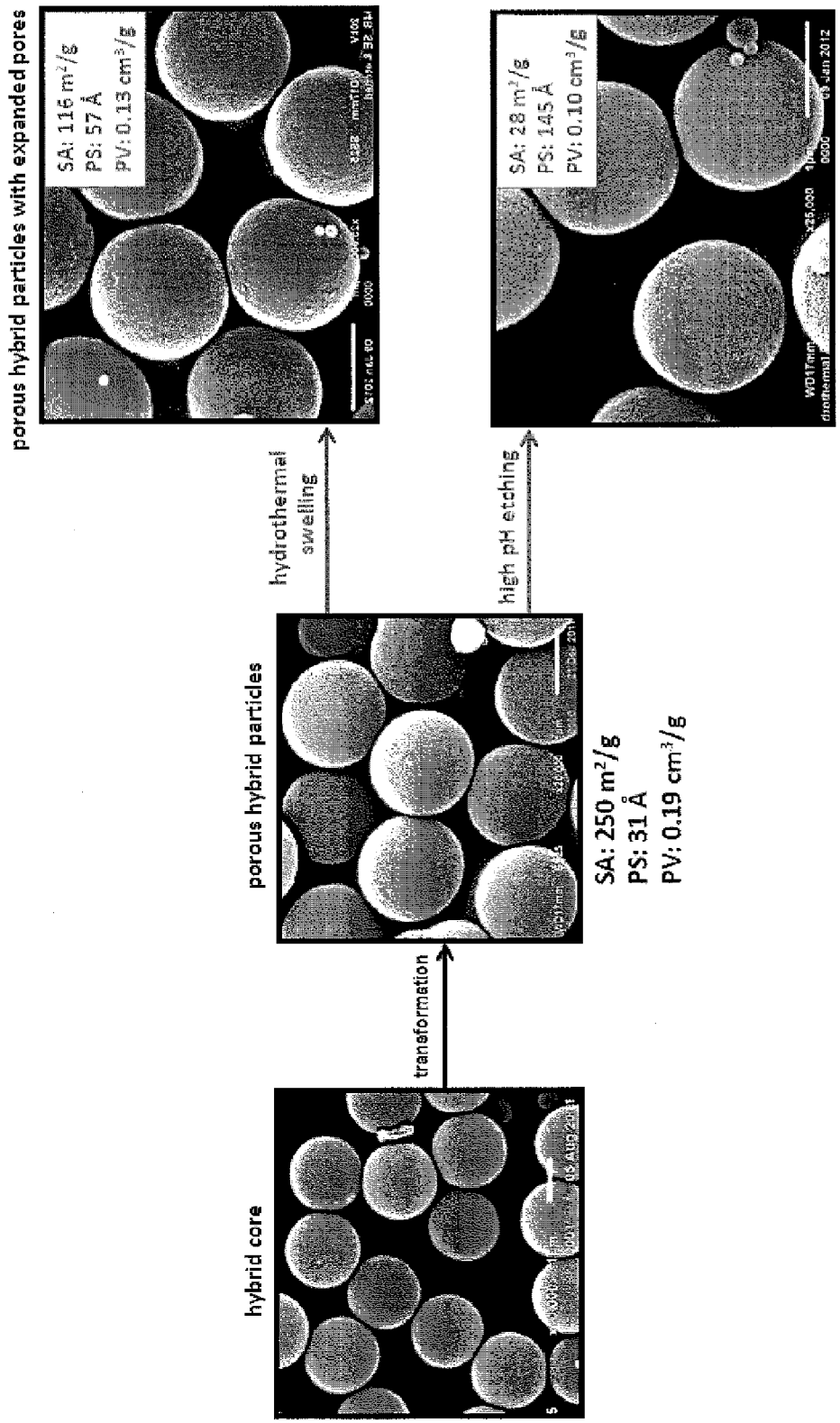
FIG. 7 shows a schematic illustrating synthetic schemes according to embodiments of the invention that involve expansion of pore sizes using hydrothermal swelling or high pH etching of the porous hybrid particles produced from hybrid cores. The SEM images are shown for the various products.

In accordance with some embodiments of the invention, the superficially porous hybrid particles may be further subjected to pore enlargement treatments (e.g., hydrothermal swelling or high pH etching to increase the pore sizes, as illustrated in FIG. 7). Hydrothermal treatments have been shown to be able to expand the pore sizes of silica or similar particles, see e.g., U.S. Pat. No. 5,897,849, issued to Alcaraz et al. As shown in FIG. 7 (EXAMPLE 12 described later), the pore sizes of the particles increased from 31 Å to 57 Å after hydrothermal swelling.

Another approach to increasing the pore sizes is to use high pH treatments. As shown in FIG. 7 (EXAMPLE 13 described later), the average pore size of the initial product was increased from 31 Å to 145 Å after the high pH etching. Similarly, low pH treatments may also be used to enlarge pores. Other etching conditions may also be used for this purpose. For example, for silica based particles, hydrofluoric acid or fluorides may be used as an etchant.

Figure 8:
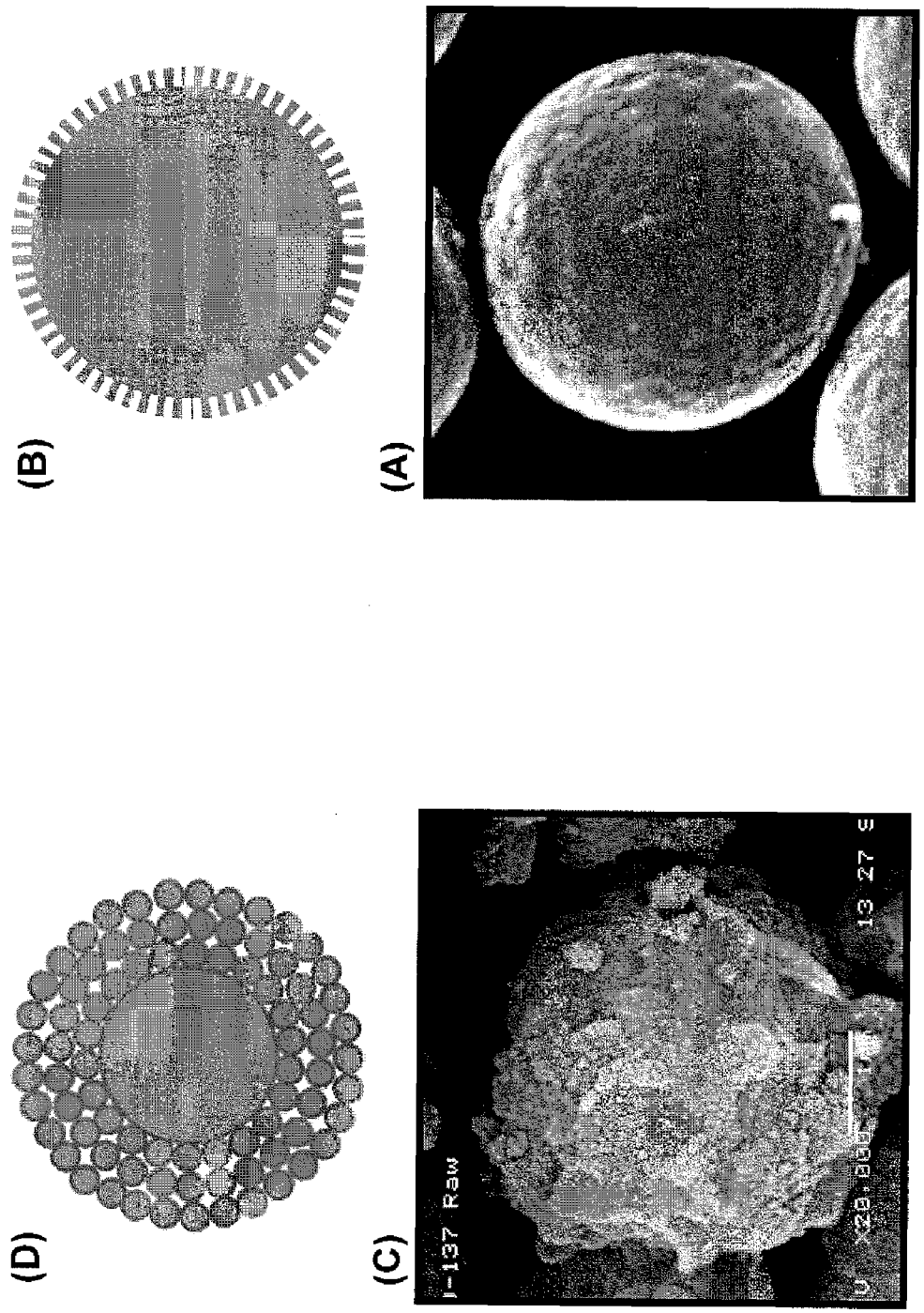
FIG. 8(A) shows a SEM image of porous particles prepared from solid core particles by the process illustrated in FIG. 6.
FIG. 8(B) shows a schematic illustrating the structure of a superficial porous particle. For comparison.
FIG. 8(C) and FIG. 8(D) show the corresponding SEM image and diagram for a prior art particle prepared according to the method of Kirkland (U.S. Patent Application Publication No. 2007/0189944).

As noted above, pseudomorphic transformation substantially retains the original size and shapes of the starting particles. Therefore, the product particles will have similar particle sizes and particle size distributions as those of the starting core particles. As shown in the SEM image in FIG. 8(A), the superficially porous particles of the invention retain the original spherical shapes of the starting core particles. In addition, the particle size distribution remains substantially unchanged after the pseudomorphic transformation. FIG. 8(B) shows a schematic, illustrating ordered pores on the superficial layer of the particles of the invention. For comparison, FIG. 8(C) shows a SEM image of a particle prepared by successive coatings of a core particle using a method of Kirkland, and FIG. 8(D) shows a schematic of a particle prepared by the method of Kirkland. Note that the schematic of FIG. 8(D) is similar to FIG. 1 of U.S. Patent Application Publication No. 2007/0189944, by Kirkland.

Pseudomorphic transformation not only preserves the original particle sizes and shapes, hence the size distribution as well, but also produces highly ordered pore structures. The highly ordered pore structures are illustrated in FIG. 9(B), which shows that the pores are oriented in substantially radial (normal to the surface) directions. As a result, the SEM image in FIG. 9(A) shows a honeycomb-like arrangement with mostly hexagonal tubular pores. The particle shown in FIG. 9(A) is prepared according to EXAMPLE 10 (described later). These highly ordered pore structures on superficial layers would provide efficient and consistent partitioning of analytes. Therefore, such particles would provide good performance in chromatography.

Figure 10:
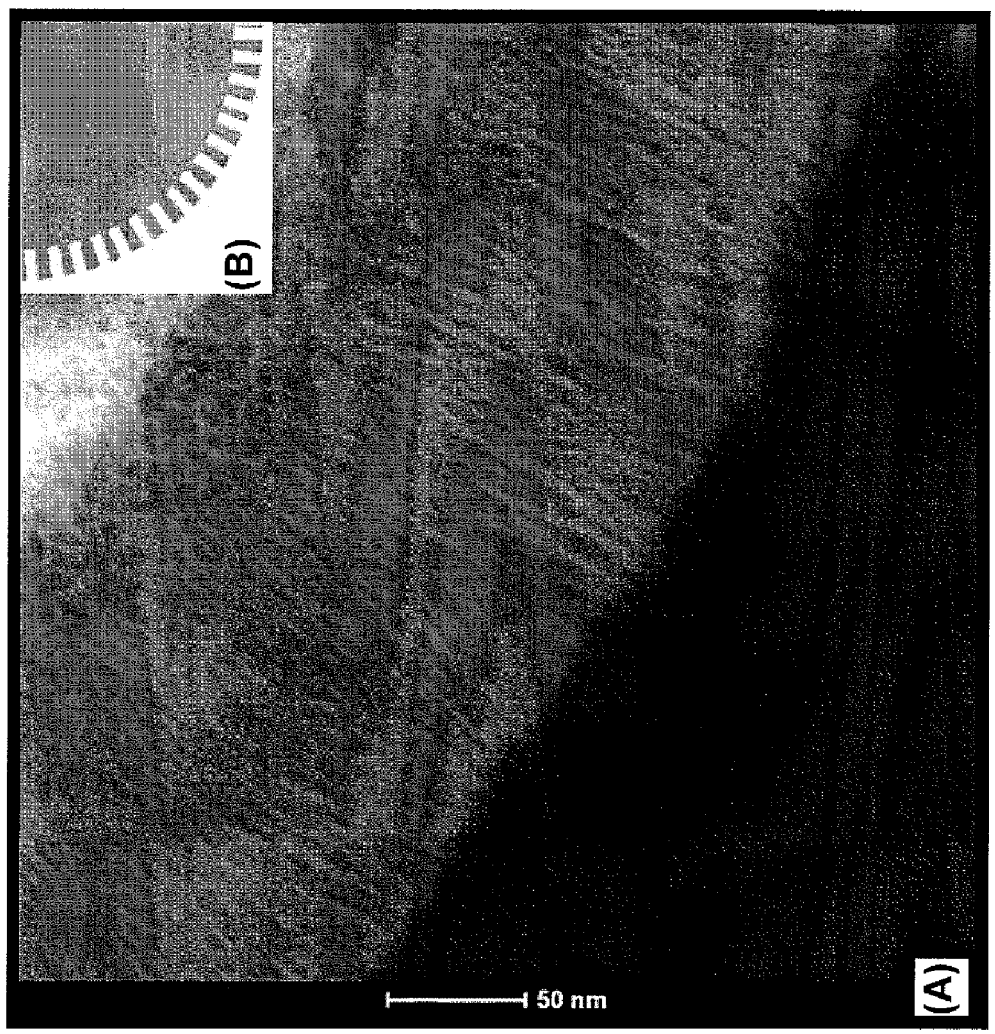
FIG. 10(A) shows an enlarged TEM image illustrating a porous layer of a porous particle of FIG. 5(B) showing a pore orientation and order consistent with the structure illustrated in FIG. 10(B).
FIG. 10(B) shows a diagram illustrating the structure of part of a superficially porous particle in accordance with one embodiment of the invention.

FIG. 10(A) shows a higher magnification of a TEM image of the superficial layer of a particle of FIG. 9(A). As can be seen in this image, the pores on the superficial layer are aligned in a substantially radial (normal to the surface) direction. FIG. 10(B) illustrates a schematic of a portion of the particle.

FIGS. 11(A) and 11(B) show SEM images of particles prepared with pseudomorphic transformation in the presence of a swelling agent. The particles also exhibit superficially porous layer with pores aligned in substantially radial direction.

The highly ordered pore structure should produce a strong distinct peak in XRD. X-ray diffraction is commonly used to measure ordered structures in solids or powders. An ordered structure will diffract X-Rays in a manner that certain diffracted rays may be "additive" when reaching a detector (or allocation on an array detector or film), while other rays will not be additive. This phenomenon is described by Bragg's law.

Figure 12:
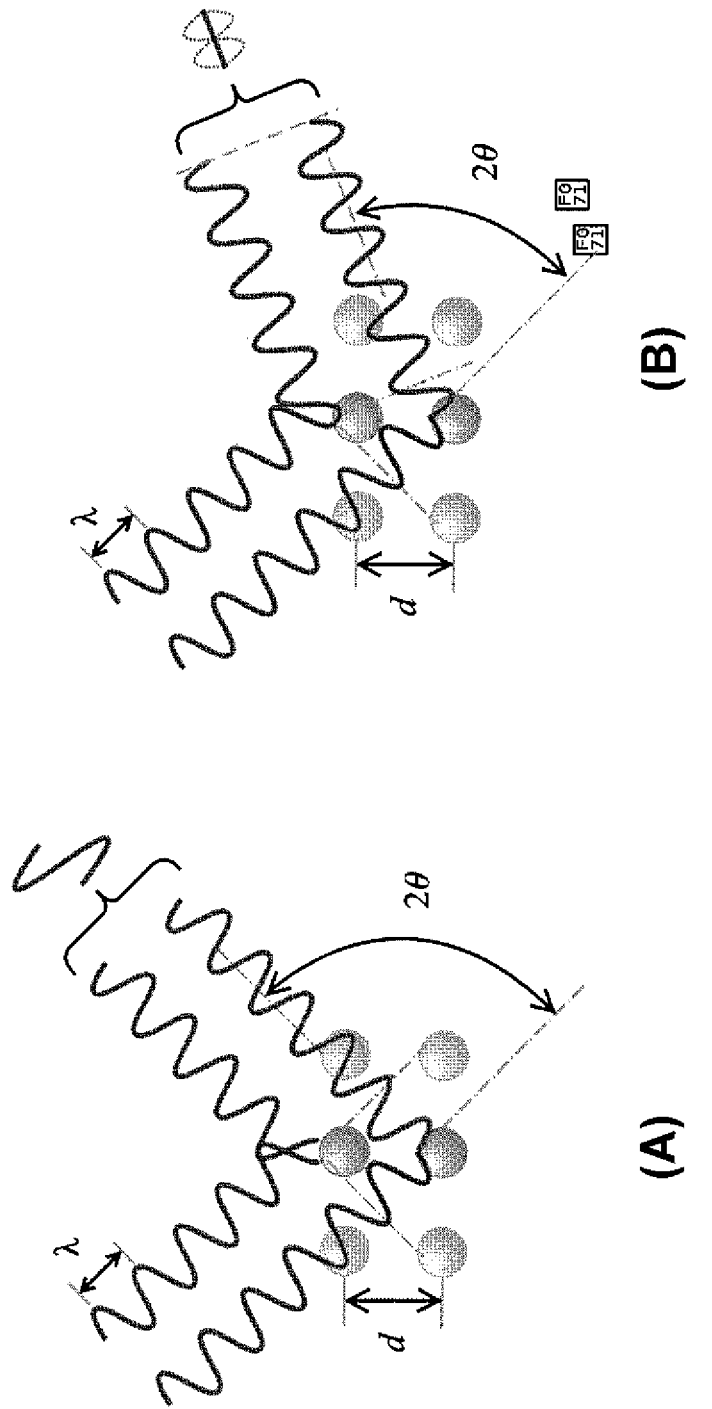
FIG. 12(A) shows a diagram illustrating additive (in phase) diffractions that meet the Bragg equation.
FIG. 12(B) shows out-of-phase diffractions.

As illustrated in FIG. 12(A), two diffracted rays will arrive at the detector location in an additive manner (in phase) if: $n\lambda = 2d \sin\theta$, wherein n is an integer, $\lambda$ is the wavelength of the X ray, $\theta$ is the angle and d is the inter-atomic distance, as illustrated in the following diagram. On the other hand, when Bragg's law is not met (as illustrated in FIG. 12(B)), the diffracted beams would be out of phase and will cancel each other out and not produce a diffraction signal at the detector location.

A $2\theta$ scan is performed by varying the X-ray incident angles ($\theta$). Only when a $\theta$ angle fulfills the Bragg's equation, $n\lambda = 2d \sin\theta$, would the diffraction signals be detected. In an ordered structure, multiple in-phase (additive) diffractions would be detected for the proper $\theta$ angle, resulting in a strong diffraction signal. Therefore, the signal intensity is an indication of the "orderness" of a structure.

Figure 13:
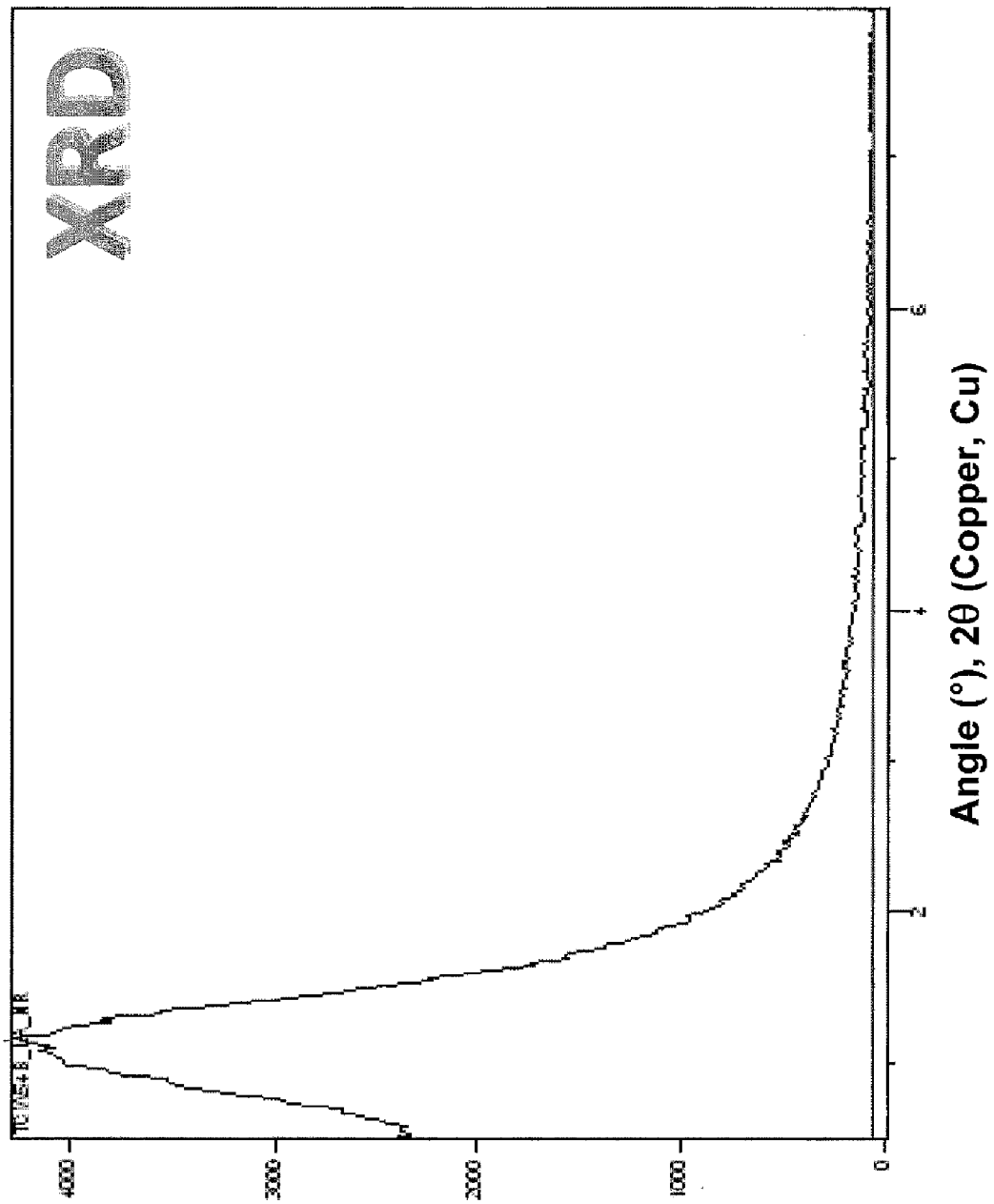
FIG. 13 shows an XRD graph illustrating a strong peak in the 0-8 degree range in a 2θ scan of superficially porous particles prepared according to one embodiment of the invention.

The fact that particles of the invention produce a strong and distinct signal in XRD in the $2\theta$ scan between 1 and 2 degrees (FIG. 13) indicates an ordered pore structure of these particles. Based on the $2\theta$ angle and the known $\lambda$ (copper source K$\alpha$ line is about 1.54 Å), one can estimate the distance of the repetitive structure using the Bragg equation. The appearance of a single peak in this example suggests the presence of a highly ordered structure. This is consistent with the SEM images (see FIG. 9(A) and FIG. 10(A)). In other embodiments, as shown in FIG. 3, the particles may also show longer range orders, as evidenced by the appearance of a second peak at a larger $2\theta$ angle.

Figure 14:
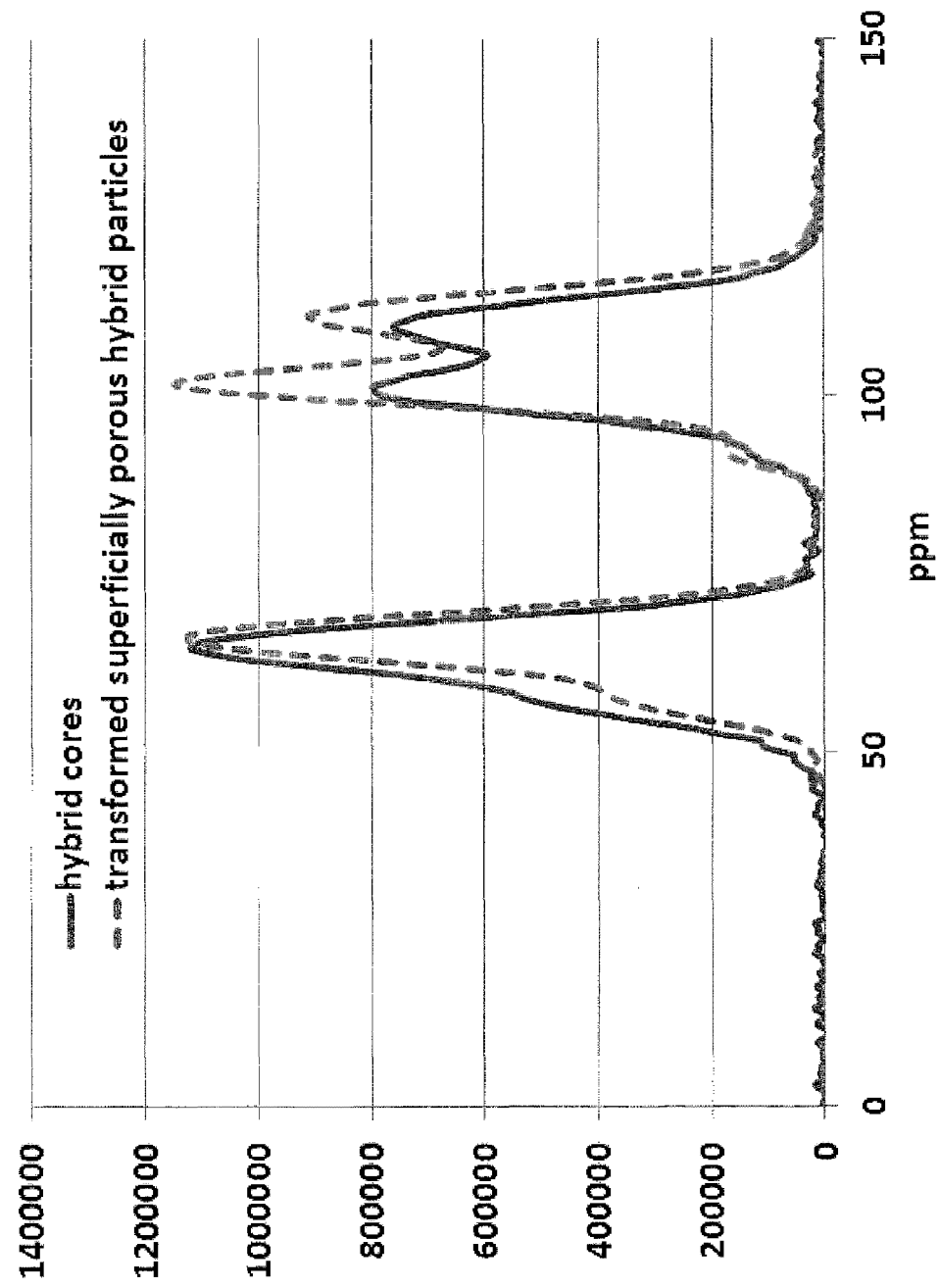
FIG. 14 shows $^{29}$Si CPMAS NMR spectra of hybrid core particles before and after pseudomorphic transformation in accordance with one embodiment of the invention.

FIG. 14 shows $^{29}Si$ CPMAS (cross polarization magic angle spinning) solid state NMR spectra of the hybrid core particles (before pseudomorphic transformation) and the transformed superficially porous hybrid particles. As shown in FIG. 14, the transformed particles have substantially the chemical entities as the original cores, as evidence by the presence of the same peaks at the same chemical shifts, with similar peak width. The transformed particles show slightly higher peak intensities for the two peaks around 100 μm.

The superficially porous particles of this invention can also be surface modified with a surface modifier having the formula $Z_a(R)_bSi$—R, where Z is selected from Cl, Br, I, $C_1$-$C_5$ alkoxy, dialkylamino, trifluoroacetoxy or trifluoromethanesulfonate; a and b are each an integer from 0 to 3, provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

Figure 3:
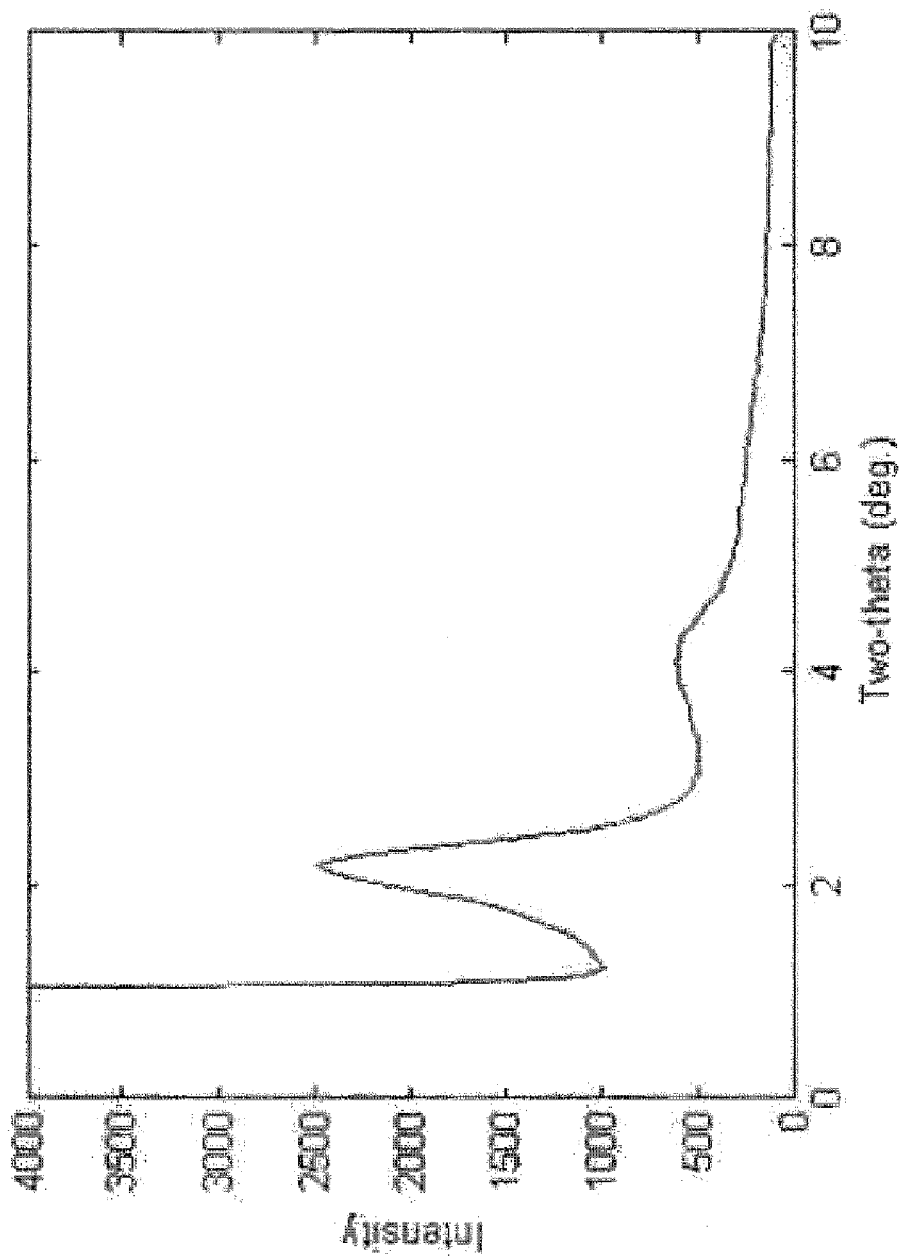
FIG. 3 is a small angle powder x-ray diffraction pattern of the product of Example 1.
Figure 4:
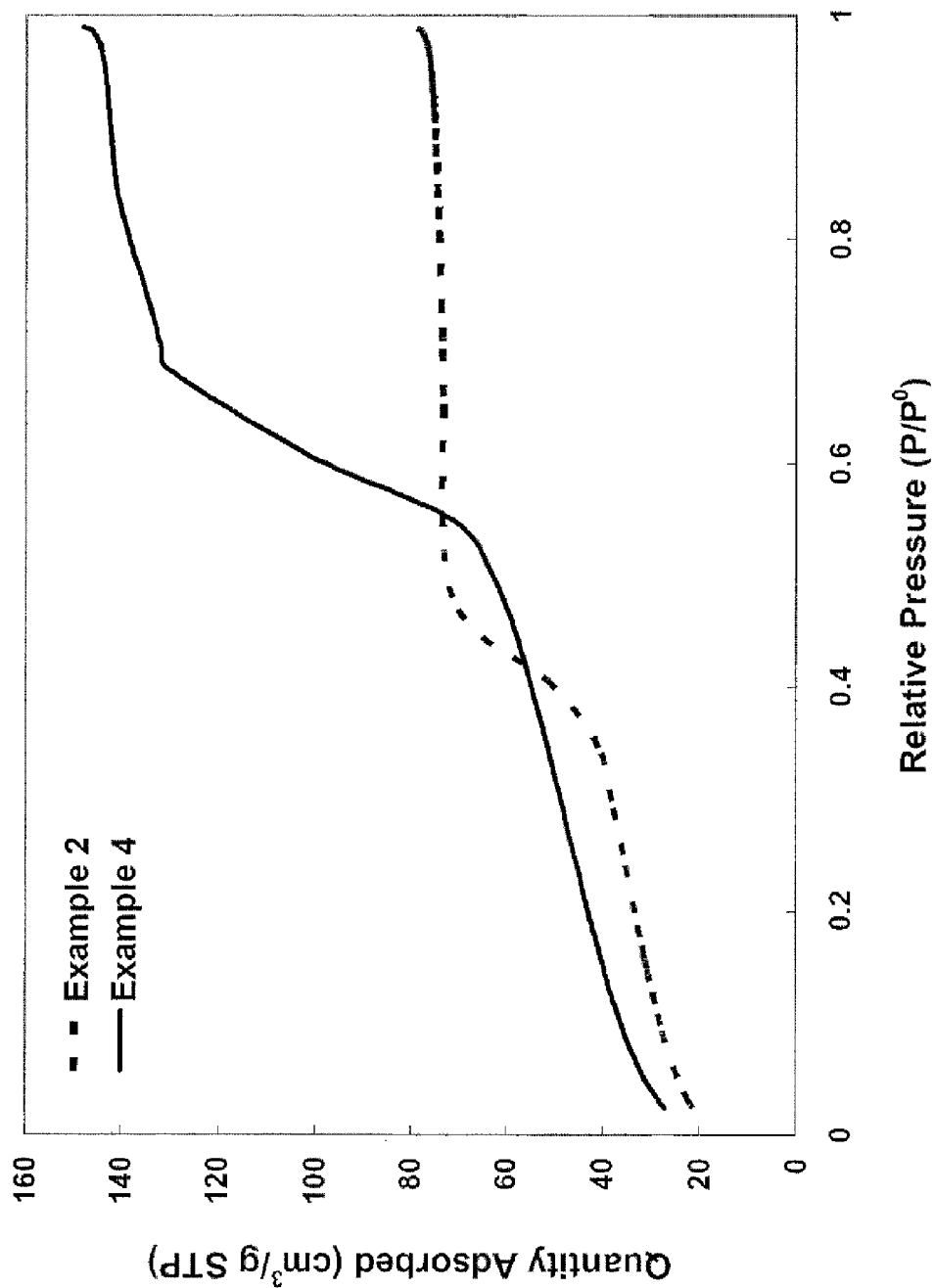
FIG. 4 is an isotherm plot of nitrogen adsorption measurements from Examples 2 and 4.

The micelle-templated superficially porous particles exhibit at least one X-ray diffraction peak between 0.01° and 10° of the $2\theta$ scan range (due to the ordered pore structure) as shown in FIG. 3. X-ray diffraction is a well known characterization technique in the art (R. Jenkins, R. L. Snyder, Introduction to X-ray Powder Diffractometry, John Wiley & Sons, Inc., New York, 1996). The ordered pore structures may be further characterized by symmetry or space groups that are observed from X-ray diffraction, including, but not limited to, hexagonal, cubic, triclinic, monoclinic, orthorhombic, tetragonal, trigonal and lamellar.

Small angle powder x-ray diffraction patterns of the superficially porous particles were recorded on a PANalytical's X'Pert diffractometer (Dupont Analytical Solutions, Delaware), equipped with a Cu—Kα radiation source. The results of SAXS on the particles made according to Example 1 below are shown in FIG. 3

Figure 5:
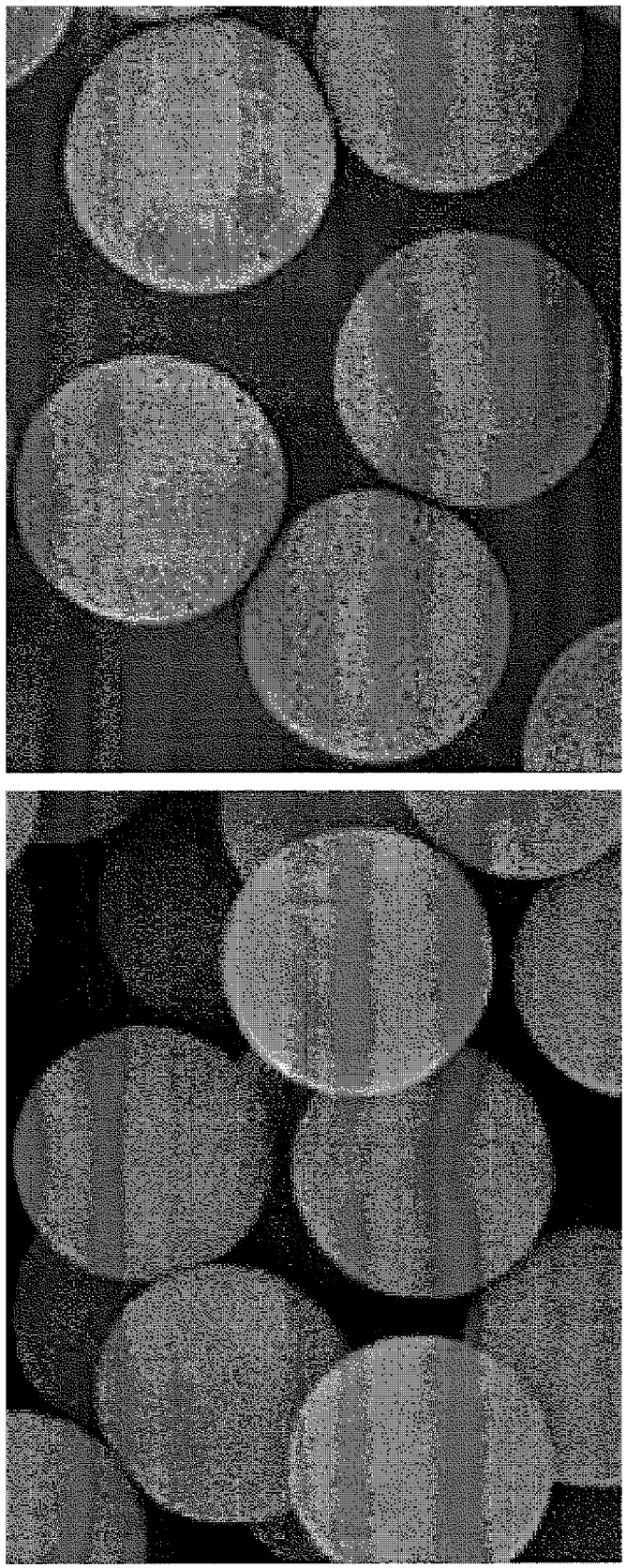
FIG. 5 is a scanning electron micrograph (SEM) of the solid cores and the product of Example 5.

Scanning electron microscopy measurements were conducted on a JEOL 640 (Micron Inc., Delaware), and an example is provided in FIG. 5 for the particles made according to Example 5 below The specific surface areas and pore sizes of the superficially porous particles made according to examples below were measured by using nitrogen Brunauer Emmett Teller (BET) isotherm on a Micromeritics analyzer.

The pore size distributions of the particles made according to examples below were calculated on the Barrett Joyner Halanda (BJH) model from a 30-point BET surface area plot. Particle sizes were determined with a Coulter Multisizer (Beckman-Coulter, USA). For particle size distribution, the standard deviation (sigma) was calculated by dividing the FWHM (full width at half maximum) of the peak by 2.3548.

Carbon loading analysis was done by a Perkin Elmer 2400 elemental analyzer.

The following examples of the products and processes are provided to further illustrate embodiments of this invention. These examples are not intended to limit the invention.

EXAMPLE 1

Solid silica particles were synthesized based on U.S. Pat. No. 4,775,520. The median particle size is 2.08 μm with a distribution of 3% (one sigma). 20.8 g of the solid particles were slurried in 1593 ml deionized water in a flat bottom flask. 230 ml of 30 wt % ammonium hydroxide and 13 g of hexadecyltrimethylammonium bromide were added. The mixture was refluxed for 24 hours, and then allowed to cool to room temperature. The solution was filtered, washed with water, ethanol and acetone, and dried in a vacuum oven at 100° C. for at least 2 hours. Then, the silica particles were calcined at 550° C. for 8 hours at a heating rate of 1° C. per minute. The nitrogen surface area of these particles was 384 m$^2$/g and the median pore size was 2.7 nm as measured by the Tristar 3000 analyzer (Micromeritics). The final particle size is 2.16 μm with a distribution of 3% (one sigma).

EXAMPLE 2

Solid silica particles were synthesized based on U.S. Pat. No. 4,775,520. The median particle size is 2.08 μm with a distribution of 3% (one sigma). 3.0 g of the solid particles were slurried in 200 ml deionized water in a flat bottom flask. 25 ml of 30 wt % ammonium hydroxide and 1.45 g of hexadecyltrimethylammonium bromide were added. The mixture was heated at 50° C. for 40 minutes under stirring. 0.6 g of decane was added to the previous solution and stirred for another one hour. Then, the solution was refluxed for 20 hours, and then allowed to cool to room temperature. The solution was filtered, washed with water, ethanol and acetone, and dried in a vacuum oven at 100° C. for at least 2 hours. Then, the silica particles were calcined at 550° C. for 8 hours at a heating rate of 1° C. per minute.

The nitrogen surface area of these particles was 119 m$^2$/g and the median pore size was 4.0 nm as measured by the Tristar 3000 analyzer (Micromeritics). The final particle size is 2.16 μm with a distribution of 3% (one sigma).

EXAMPLE 3

Solid silica particles were synthesized based on U.S. Pat. No. 4,775,520. The median particle size is 2.08 μm with a distribution of 3% (one sigma). 3.0 g of the solid particles were slurried in 200 ml deionized water in a flat bottom flask. 25 ml of 30 wt % ammonia hydroxide and 1.45 g of hexadecyltrimethylammonium bromide were added. The mixture was heated at 50° C. for 40 minutes under stirring. 1.2 g of decane was added to the previous solution and stirred for another one hour. Then, the solution was refluxed for 20 hours, and then allowed to cool to room temperature. The solution was filtered, washed with water, ethanol and acetone, and dried in a vacuum oven at 100° C. for at least 2 hours. Then, the silica particles were calcined at 550° C. for 8 hours at a heating rate of 1° C. per minute.

The nitrogen surface area of these particles was 125 m$^2$/g and the median pore size was 5.0 nm with a distribution of 14% (one sigma) as measured by the Tristar 3000 analyzer (Micromeritics). The final particles size is 2.22 μm with a distribution of 3% (one sigma).

EXAMPLE 4

Solid silica particles were synthesized based on U.S. Pat. No. 4,775,520. The median particle size is 2.08 μm with a distribution of 3% (one sigma). 3.0 g of the solid particles were slurried in 200 ml deionized water in a flat bottom flask. 25 ml of 30 wt % ammonia hydroxide and 1.45 g of hexadecyltrimethylammonium bromide were added. The mixture was heated at 50° C. for 40 minutes under stirring. 1.8 g of decane was added to the previous solution and stirred for another one hour. Then, the solution was refluxed for 20 hours, and then allowed to cool to room temperature. The solution was filtered, washed with water, ethanol and acetone, and dried in a vacuum oven at 100° C. for at least 2 hours. Then, the silica particles were calcined at 550° C. for 8 hours at a heating rate of 1° C. per minute.

The nitrogen surface area of these particles was 152 m$^2$/g and the median pore size was 5.9 nm with a distribution of 11% (one sigma) as measured by the Tristar 3000 analyzer (Micromeritics). The final particle size is 2.28 μm with a distribution of 3% (one sigma).

EXAMPLE 5

Solid silica particles were synthesized based on U.S. Pat. No. 4,775,520. The median particle size is 1.92 μm with a distribution of 3% (one sigma). 3.0 g of the solid particles were slurried in 200 ml deionized water in a flat bottom flask. 25 ml of 30 wt % ammonia hydroxide and 1.5 g of trimethyloctadecylammonium bromide were added. The mixture was heated at 50° C. for 40 minutes under stirring. 2.2 g of tridecane was added to the previous solution and stirred for another one hour. Then, the solution was refluxed for 20 hours, and then allowed to cool to room temperature. The solution was filtered, washed with water, ethanol and acetone, and dried in a vacuum oven at 100° C. for at least 2 hours. Then, the silica particles were calcined at 550° C. for 8 hours at a heating rate of 1° C. per minute. The elemental analysis (carbon loading) was measured by the Perkin Elmer 2400 analyzer (Micro-Analysis, Inc). The measured carbon loading is 0.05% which indicates the surfactants were removed.

The nitrogen surface area of these particles was 200 m$^2$/g and the median pore size was 7.4 nm with a distribution of 9% (one sigma) as measured by the Tristar 3000 analyzer (Micromeritics). The final particles size is 2.0 μm with a distribution of 3% (one sigma).

EXAMPLE 6

Solid silica particles were synthesized based on U.S. Pat. No. 4,775,520. The median particle size is 1.60 μm with a distribution of 3% (one sigma). 3.2 g of the solid particles were slurried in 245 ml deionized water in a flat bottom flask. 35 ml of 30 wt % ammonium hydroxide, 1.7 g of hexadecyltrimethylammonium bromide and 12.6 g of trimethylbenzene were added. The mixture was then refluxed for 20 hours, and then allowed to cool to room temperature. The solution was filtered, washed with water, ethanol and acetone, and dried in a vacuum oven at 100° C. for at least 2 hours. Then, the silica particles were calcined at 550° C. for 8 hours at a heating rate of 1° C. per minute. The nitrogen surface area of these particles was 75 m$^2$/g and the median pore size was 8.9 nm with a distribution of 30% (one sigma) as measured by the Tristar 3000 analyzer (Micromeritics). The final particle size is 1.63 μm with a distribution of 3% (one sigma).

EXAMPLE 7

Solid silica particles were synthesized based on U.S. Pat. No. 4,775,520. The median particle size is 2.08 μm with a distribution of 3% (one sigma). 3.0 g of solid silica particles were slurried in 200 ml deionized water in a flat bottom flask. 25 ml of 30 wt % ammonium hydroxide and 1.45 g of trimethyloctadecylammonium bromide were added. The mixture was heated at 50° C. for 40 minutes under stirring. 2.2 g of tridecane was added to the previous solution and stirred for another one hour. 3.0 g of bis(triethoxysilyl)ethane was added and then the solution was refluxed for 20 hours, and then allowed to cool to room temperature. The solution was filtered, washed with water, ethanol and acetone, and dried in a vacuum oven at 100° C. for at least 2 hours. Then, the silica particles were reslurried in 450 ml of ethanol and 10.5 g of 37 wt % hydrogen chloride at 50° C. for 6 hours. The elemental analysis (carbon loading) was measured by the Perkin Elmer 2400 analyzer (Micro-Analysis, Inc). The measured carbon loading is 3.47% which indicates the organic hydrocarbon is incorporated into the silica framework.

The nitrogen surface area of these particles was 80 m$^2$/g and the median pore size was 7.2 nm as measured by the Tristar 3000 analyzer (Micromeritics). The final particle size is 2.13 μm with a distribution of 3% (one sigma).

EXAMPLE 8

3.0 g of solid alumina particles having a median diameter of 2.0 μm are mixed in 200 ml deionized water in a flat bottom flask to make a slurry. 0.1 wt % hydrochloric acid, and 1.45 g of hexadecyltrimethylammonium bromide are added. The mixture is heated at 50° C. for 40 minutes under stirring. Then, the solution is refluxed for 20 hours, and then allowed to cool to room temperature. The solution is filtered, washed with water, ethanol and acetone, and dried in a vacuum oven at 100° C. for at least 2 hours. Then the silica particles are calcined at 550° C. for 8 hours at a heating rate of 1° C. per minute.

While the superficially porous particles of the invention may be prepared starting with a pure metal oxide core, some embodiments of the invention may be prepared starting with hybrid cores (i.e., hybrids of organic and inorganic cores).

EXAMPLE 9

Synthesis of 100 wt % Hybrid Cores

For the preparation of hybrid cores, the methods disclosed in U.S. Pat. No. 4,775,520, or similar methods, may be used. For example, 40 g of NH$_4$OH is mixed with 200 g of water and 58 g of propanol in a 500 ml flask, and the resulting mixture is heated to 60° C. 18 g of bistrimethoxysilylethyl benzene is then added to the solution under vigorous stirring for one hour. The particles are collected by centrifugation and dried at 110° C. overnight. The average particle size of the product is measured with Zetasizer™ Nano-S DLS (dynamic light scattering) instrument (Malvern Instruments Ltd., Worcestershire, UK) and found to be about ~0.9 μm.

The core particles of this reaction contain a single type of organic component.

Therefore, they are referred to as 100 wt % cores. One may also prepare cores having mixed organic components in any predetermined ratios, as illustrated in the next example.

EXAMPLE 10

Transformation of the Hybrid Cores

The hybrid cores (such as those prepared according to the methods in the above examples) may be pseudomorphically transformed as described above. For example, according to one method, water (200 g) and 1.6 g of C$_{18}$TAB (octadecyltrimethylammonium bromide) are dissolved with heating in a 500 mL round bottom flask. To the C$_{18}$TAB solution, 3 g of tridecane is added, and the solution is heated to 50° C. for 30 minutes to give a surfactant solution. Separately, 3 g of 10% hybrid cores (10:90 wt % of BES:TEOS) are dispersed in 30 g of water with sonication. Then, 32 g of NH$_4$OH is added to the surfactant solution prepared above, and then the suspension of the cores is added. The mixture in the 500 mL round bottom flask is heated to 92° C. for 20 hours. The particles are then collected by filtration and dried at 110° C. overnight. After removing the surfactant by solvent extraction, the particles were found to have an average surface area of 243 m$^2$/g, an average pore volume of about 0.42 cm$^3$/g, and an average pore size of about 69 Å. The carbon load of these particles is about 2.30%.

EXAMPLE 11

Transformation of Hybrid Cores in the Presence of a Swelling Agent

In accordance with embodiments of the invention, pseudomorphic transformation may be performed in the presence of a swelling agent to produce particles with larger pores. For example, 3 g of 10% BES (1,2-bis(triethoxy)silylethane) cores (10:90 wt % of BES:TEOS) are dispersed in 30 g of water with sonication. 3.2 g of C$_{18}$TAB is dissolved in 200 g of water with 14 g of tridecane at 50° C. for 30 minutes in a round bottom flask. One (1) g of NH$_4$OH and 0.5 g of a 25% solution of TMAOH (tetramethylammonium hydroxide) are added, followed by the addition of the dispersed cores. The solution is then heated to 50° C. for 3 days. The particles are collected by centrifugation (e.g., at 2000 rpm for 10 minutes) and washed with a solvent (e.g., EtOH). The particles are dispersed in 100 g of water and 1.5 g of 37% HCl, and the resulting mixture is heated to 60° C. for 20 hours to extract the surfactant. After removing the surfactant by solvent extraction, the particles are found to have an average surface area of about 121 m²/g, an average pore volume of about 0.18 cm³/g, and an average pore size of about 60 Å.

EXAMPLE 12

Post-hydrothermal Swelling

As noted above, particles prepared by the pseudomorphic transformation may be further processed to improve their properties, such as to increase the pore sizes. Two possible approaches to increasing the pore sizes are illustrated in FIG. 7: hydrothermal treatment (or hydrothermal swelling) and etching (e.g., high pH etching or fluoride etching for silica particles).

In this example, 2 grams of $C_{16}TAB$ (Hexadecyl Trimethyl Ammonium Bromide) are added into a 0.5 L flask and mixed with 363 g of water and 32.7 g of $NH_4OH$. The solution is then heated to 40° C. for 30 mins under stirring. Then, a 20 wt % hybrid silica core (20:80% of BES:TEOS) aqueous solution is added into the flask, and the mixture is heated to 85° C. for 22 hours. The particles are then collected by filtration and dried at 110° C. overnight. After removing the surfactant by solvent extraction, the particles are found to have an average surface area of 250 m²/g, an average pore volume of 0.19 cm³/g, and an average pore size of 31 Å.

Hydrothermal swelling was performed by mixing 1.5 g of the as-synthesized samples with a mixture of 10 g of water, 8 g of EtOH, and 17 g of TMB (trimethylbenzene) in an autoclave at 130° C. for 3 days. The particles were then collected by filtration and dried at 110° C. overnight. After removing the surfactant by solvent extraction, the particles were found to have an average surface area of about 116 m²/g, an average pore volume of about 0.13 cm³/g, and an average pore size of about 57 Å (see FIG. 7). The carbon load of the particle is about 2.67%.

Hydrothermal treatment clearly increases the pore sizes (from 31 Å to 57 Å) of these particles, while there is less impact on the pore volumes (from 0.19 cm³/g to 0.13 cm³/g). These results suggest that hydrothermal treatment probably cause consolidation of the pores, resulting in fewer, but larger, pores without significantly changing the overall pore volumes. The specific surface areas are also reduced (from 250 m²/g to 116 m²/g). The reduction in the surface areas is consistent with the particles having fewer, but larger, pores.

EXAMPLE 13 pH Etching

A second approach to increasing pore sizes is by etching. Etching may be accomplished by acid (low pH) or base (high pH), or by specific ions (e.g., fluoride ion for etching silica particles). By low pH, it is meant a pH value of less than 7.0, preferably less than 6.0, more preferably less than 5.0. By high pH, it is meant a pH value of higher than 7.0, preferably higher than 8.0, more preferably higher than 9.0.

In this example, 1.5 g of solvent-extracted sample prepared in the above Example is mixed with 10 g of water and 0.5 g of TRIS (tris(hydroxymethyl)aminomethane) and the mixture is heated in an autoclave at 130° C. for 3 days. The particles are then collected by filtration and dried at 110° C. overnight. After removing the surfactant by solvent extraction, the particles are found to have an average surface area of about 28 m²/g, an average pore volume of about 0.10 cm³/g and an average pore size of about 145 Å (see FIG. 7). The carbon load of these particles is about 2.49%

The etching substantially increases the pore sizes (from 31 Å to 145 Å) of these particles. The fact that the pore volume is not increased would suggest that there are fewer, but larger, pores after the etching. The substantially reduced specific surface area (from 250 m²/g to 28 m²/g) would be consistent with this.

Some embodiments of the invention relate to separation devices using any of the above described superficially porous particles. A separation device in accordance with embodiments of this invention may have a stationary phase comprising superficially porous particles that comprise:

(a) solid cores having a size ranging from about 20% to about 99% of the size of the entire particles;
(b) substantially porous outer shells wherein the median pore size ranges from about 15 to about 1000 Å;
(c) wherein the particles have a specific surface area of from about 5 to about 1000 m²/g;
(d) wherein the particles have a median size range from about 0.5 μm to about 1000 μm; and
(e) wherein the particles comprise a metal oxide, selected from silica, alumina, zirconia, or titania.

In addition, a separation device in accordance with embodiments of this invention may have particles that have been surface modified with a surface modifier having the formula $Z_a(R')_b Si$—R as described above, preferably where R is selected from alkyl, alkenyl, alkynyl, aryl, diol, amino-, alcohol, amide, cyano, ether, nitro, carbonyl, epoxide, sulfonyl, cation exchanger, anion exchanger, carbamate and urea. When R is alkyl, preferably it is selected from a $C_1$-$C_{30}$ alkyl group. Preferably, the separation device employs superficially porous particles, wherein the surface modifier is selected from octyltrichlorosilane, octadeyltrichlorosilane, octyldimethylchlorosilane, and octadecyldimethylchlorosilane, most preferably octyldimethylchlorosilane and octadecyldimethylchlorosilane.

Examples of the separation devices of this invention may include chromatographic columns, chips, solid phase extraction media, pipette tips and disks.

Advantages of methods of the invention may include one or more of the following. Embodiments of the invention provide superficially porous hybrid particles that each contain a solid core and an ordered outer shell. Such superficially porous particles can provide fast diffusions of analytes in and out of the pores, allowing for fast liquid chromatography. At the same time, the solid cores can provide the mechanical strength, allowing one to use higher pressures. Therefore, these particles would be beneficial for HPLC applications.

The pores in the outer shells of these particles are highly ordered, which provide consistent geometries on the stationary phase. In addition, the superficially porous hybrid particles of the invention have well defined geometry (e.g., spherical) with narrow particle size distributions, narrow pore size distributions, and large pore sizes. These properties would favor fast separation and high resolution when used as chromatography media.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. Superficially porous particles, comprising:
   solid cores each comprising an inorganic material or a hybrid material, said hybrid material including an inorganic material and an organic material; and
   porous outer shells each comprising the inorganic material or the hybrid material, and having ordered pores, wherein the ordered pores have a median pore size in a range from about 15 to about 1000 Å and produce at least one X-ray diffraction peak between 0.01° and 10° of a 2θ scan range, and wherein the ordered pores are elongated pores aligned substantially in a radial direction;
   wherein the particles have a median size range from about 0.5 μm to about 100 μm, and
   wherein the inorganic material comprises a metal oxide selected from silica, alumina, titania or zirconia.

2. The superficially porous particles of claim 1, wherein the solid cores each comprise the hybrid material and the porous outer shells each comprise the inorganic material.

3. The superficially porous particles of claim 1, wherein the solid cores each comprise the hybrid material and the porous outer shells each comprise the hybrid material.

4. The superficially porous particles of claim 1, wherein the particles have a specific surface area of from about 5 to about 1000 m$^2$/g.

5. The superficially porous particles of claim 1, wherein the median size of the particles is from about 0.5 μm to about 10 μm.

6. The superficially porous particles of claim 1, wherein the particles have solid cores having a size ranging from about 20% to about 99% of the size of the entire particles.

7. The superficially porous particles of claim 1, wherein the organic material is covalently attached to the metal oxide and the particles have a composition selected from:

$$MO_2/(R^1_p R^1_q MO_t)_n \text{ or } MO_2/[R^2(R^1_r MO_t)_m]_n$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

8. The superficially porous particles of claim 7, wherein M is Si.

9. The superficially porous particles of claim 8, wherein $R^1$ and $R^2$ are independently methyl, or ethyl, $R^3$ is methylene, ethylene or 1,2-benzylene.

10. The superficially porous particles of claim 1, wherein the organic material is covalently attached to the metal oxide and the metal oxide is alumina oxide, wherein the particles have a composition selected from:

$$Al_2O_3/(R^1 AlO)_n \text{ or } Al_2O_3/[R^2(AlO_m]_n$$

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more metal atoms; m is an integer greater than or equal to 2; and n is a number from 0.01 to 100.

11. The superficially porous particles of claim 1, wherein the particles have been surface modified with a surface modifier having the formula $Z_a(R')_b Si$—R, where Z is selected from Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

12. A method for making superficially porous particles, comprising:
    subjecting substantially solid particles in an aqueous solution to agitation for a time and a pH sufficient to pseudomorphically transform the solid particles, in the presence of one or more surfactants, to produce the superficially porous particles comprising solid cores and porous outer shells, wherein:
    the solid cores each comprise an inorganic material or a hybrid material, said hybrid material including an inorganic material and an organic material;
    the inorganic material comprises a metal oxide selected from, silica, alumina, zirconia, or titania;
    the porous outer shells each comprise the inorganic material or the hybrid material, and have ordered pores, wherein the ordered pores are elongated pores aligned substantially in a radial direction.

13. The method of claim 12, wherein the aqueous solution comprises a swelling agent.

14. The method of claim 12, further comprising subjecting the superficially porous hybrid particles to a pore expansion treatment.

15. The method of claim 14, wherein the pore expansion treatment comprises hydrothermal treatment or etching.

16. The method of claim 15, wherein the etching is by heating in a solution having a pH value of 8.0 or higher, or a pH value of 6.0 or lower.

17. The method of claim 15, wherein the etching is performed in the presence of a fluoride ion and the metal oxide comprises silica oxide.

18. The method of claim 12, wherein the one or more surfactants comprise one selected from the group consisting of a polyoxyethylene sorbitan, a polyoxythylene ether, a block copolymer, an alkyltrimethylammonium, an alkyl phosphate, an alkyl sulfate, an alkyl sulfonate, a sulfosuccinate, a carboxylic acid, a surfactant comprising an octylphenol polymerized with ethylene oxide, and a combination thereof.

19. The method of claim 13, wherein the swelling agent is selected from an alkyl substituted benzene, a dialkylamine, a trialkylamine, a tetraalkyl ammonium salt, an alkane of the formula $C_n H_{2n+2}$, a cycloalkane of the formula $(C_n H_{2n})$, a substituted alkane of the formula $(X-C_n H_{2n+1})$, or a substituted cycloalkane of the formula $(X-C_n H_{2n-1})$, wherein n is an integer of 5-20, and X is chloro-, bromo-, or —OH.

20. The superficially porous particles of claim 1, wherein the solid cores and the porous outer shells are selected from the group consisting of:
    the solid cores each comprise the inorganic material and the porous outer shells each comprise the inorganic material; and the solid cores each comprise the inorganic material and the porous outer shells each comprise the hybrid material.

21. The method of claim 12, wherein the solid cores and the porous outer shells are selected from the group consisting of:
- the solid cores each comprise the inorganic material and the porous outer shells each comprise the inorganic material; and
- the solid cores each comprise the inorganic material and the porous outer shells each comprise the hybrid material;
- the solid cores each comprise the hybrid material and the porous outer shells each comprise the inorganic material; and
- the solid cores each comprise the hybrid material and the porous outer shells each comprise the hybrid material.

22. The method of claim 12, wherein:
the ordered pores have a median pore size in a range from about 15 to about 1000 Å and produce at least one X-ray diffraction peak between $0.01°$ and $10°$ of a $2\theta$ scan range; and
the particles have a median size range from about 0.5 μm to about 100 μm.

\* \* \* \* \*

UNITED STATES PATENT AND TRADEMARK OFFICE
CERTIFICATE OF CORRECTION

| | |
|---|---|
| PATENT NO. | : 9,284,456 B2 |
| APPLICATION NO. | : 13/614903 |
| DATED | : March 15, 2016 |
| INVENTOR(S) | : Charles Lofton et al. |

Page 1 of 1

It is certified that error appears in the above-identified patent and that said Letters Patent is hereby corrected as shown below:

Specification

In column 2, line 52, delete "8 µM" and insert -- 8 µm --, therefor.

In column 5, line 5, delete "polyoxythylene" and insert -- polyoxyethylene --, therefor.

In column 9, line 1, delete "polyoxythylene" and insert -- polyoxyethylene --, therefor.

In column 9, line 42, delete "MV:" and insert -- I-IV: --, therefor.

In column 9, line 63, delete "MV," and insert -- I-IV, --, therefor.

In column 9, line 65, delete "ethyltriethoxy silane," and insert -- ethyltriethoxysilane, --, therefor.

In column 10, line 29, delete "tertraalkyl" and insert -- tetraalkyl --, therefor.

In column 10, line 35, delete "(X—C—$H_{2n-1}$)" and insert -- (X—$C_nH_{2n-1}$) --, therefor.

In column 12, line 43, after "100 µm" insert -- . --.

In column 13, line 48, delete "100" and insert -- 100 µm. --, therefor.

In column 16, line 48, delete "µm." and insert -- ppm. --, therefor.

In column 16, line 51, delete "$Z_a(R)_bSi$—R," and insert -- $Z_a(R')_bSi$—R, --, therefor.

In column 17, line 8, after "FIG. 3" insert -- . --.

In column 17, line 12, after "below" insert -- . --.

In column 17, line 20, delete "Halanda" and insert -- Halenda --, therefor.

In column 22, line 2, delete "2.49%" and insert -- 2.49%. --, therefor.

In column 22, line 36, delete "octadeyltrichlorosilane," and insert -- octadecyltrichlorosilane, --, therefor.

Claims

In column 24, line 49, in claim 18, delete "polyoxythylene" and insert -- polyoxyethylene --, therefor.

Signed and Sealed this
Thirty-first Day of May, 2016

Michelle K. Lee
*Director of the United States Patent and Trademark Office*